G. P. CARROLL.
AUTOMATIC ABSORPTION REFRIGERATING SYSTEM.
APPLICATION FILED JULY 20, 1907.
978,557.
Patented Dec. 13, 1910.
9 SHEETS—SHEET 5.
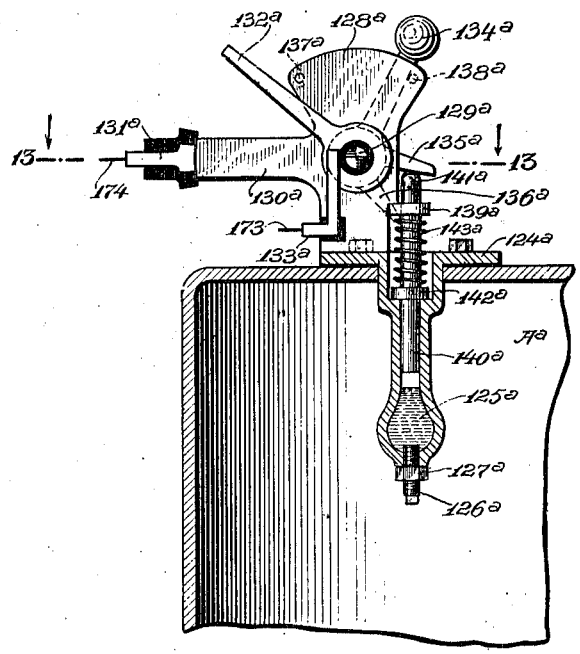
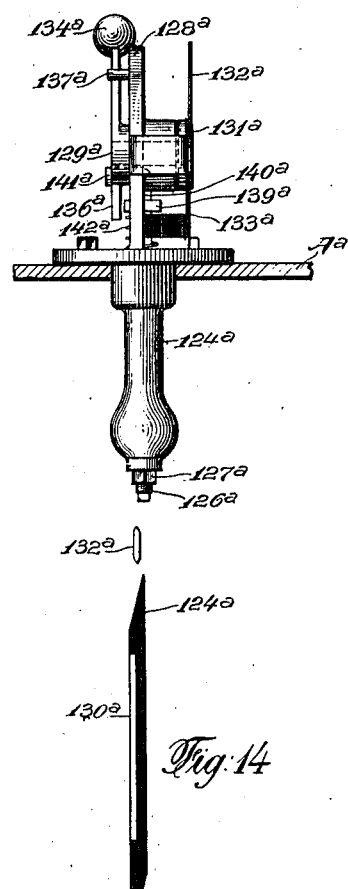
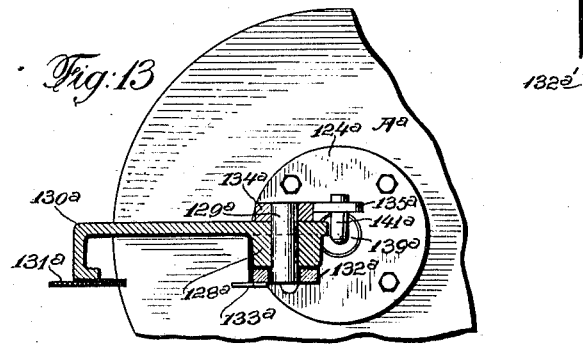
Witnesses:
A. Maude Kimber.
Edward F. Hallen.
Inventor
George P. Carroll G. P. CARROLL.
AUTOMATIC ABSORPTION REFRIGERATING SYSTEM.
APPLICATION FILED JULY 20, 1907.
978,557.
Patented Dec. 13, 1910.
9 SHEETS—SHEET 6.
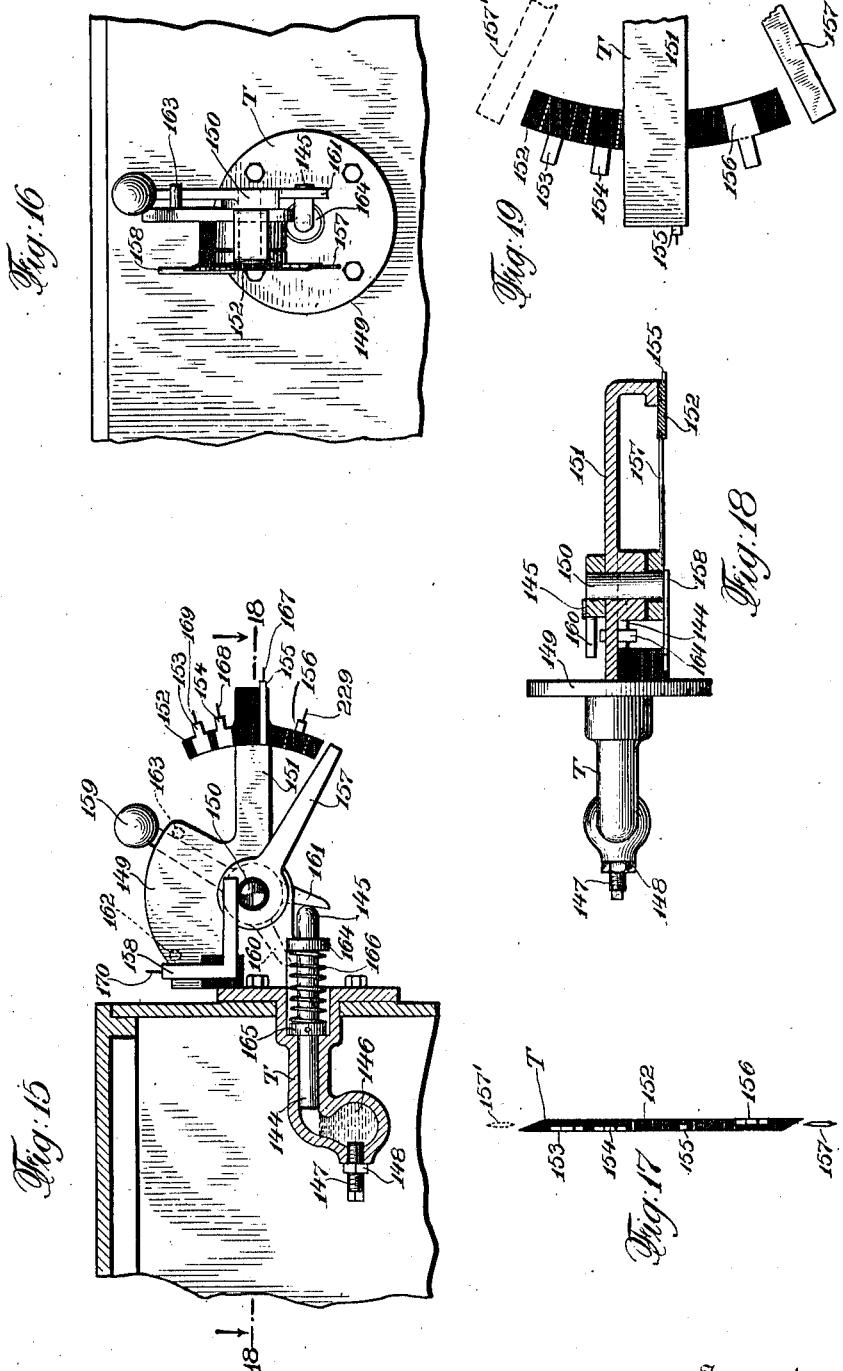

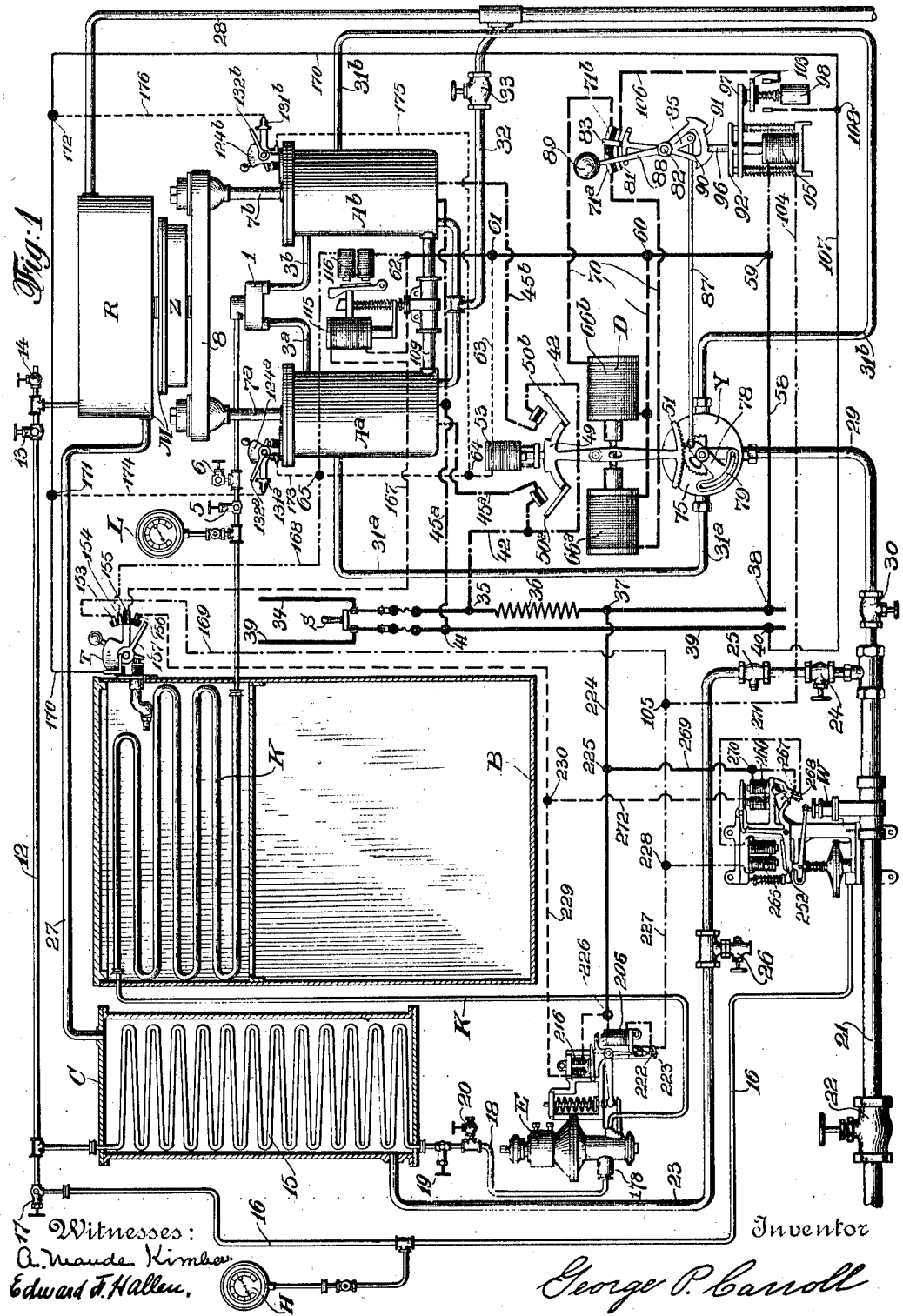

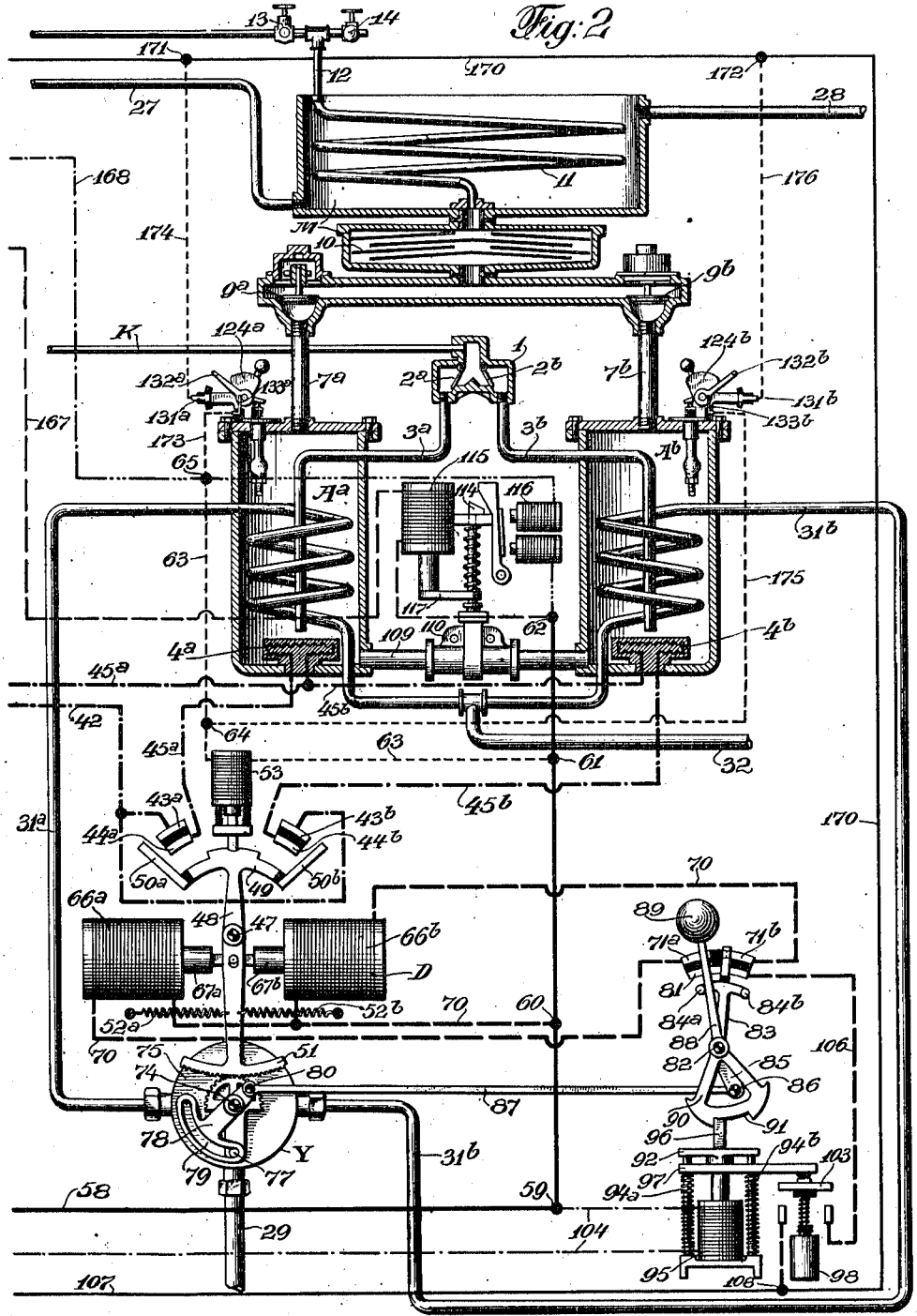

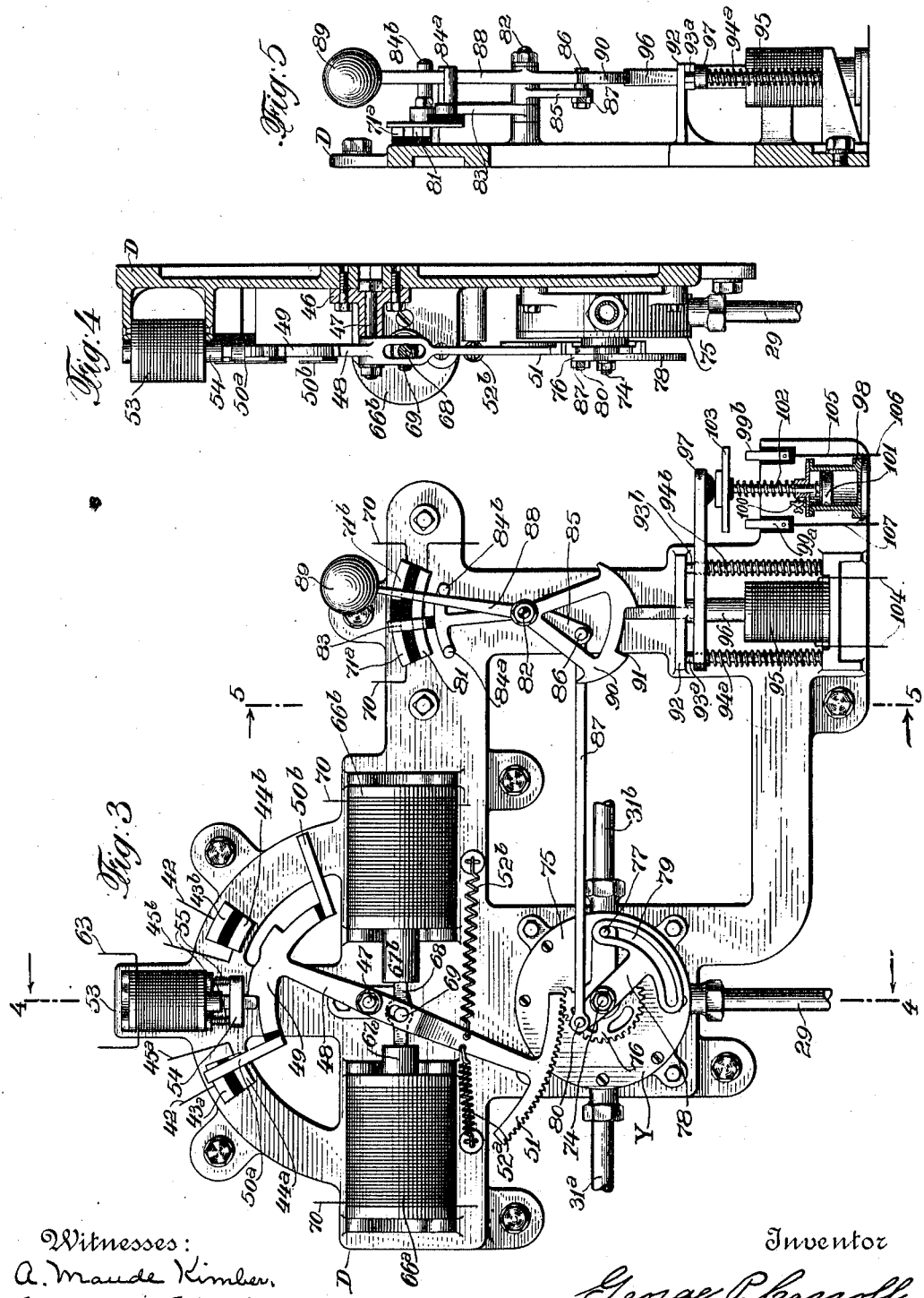

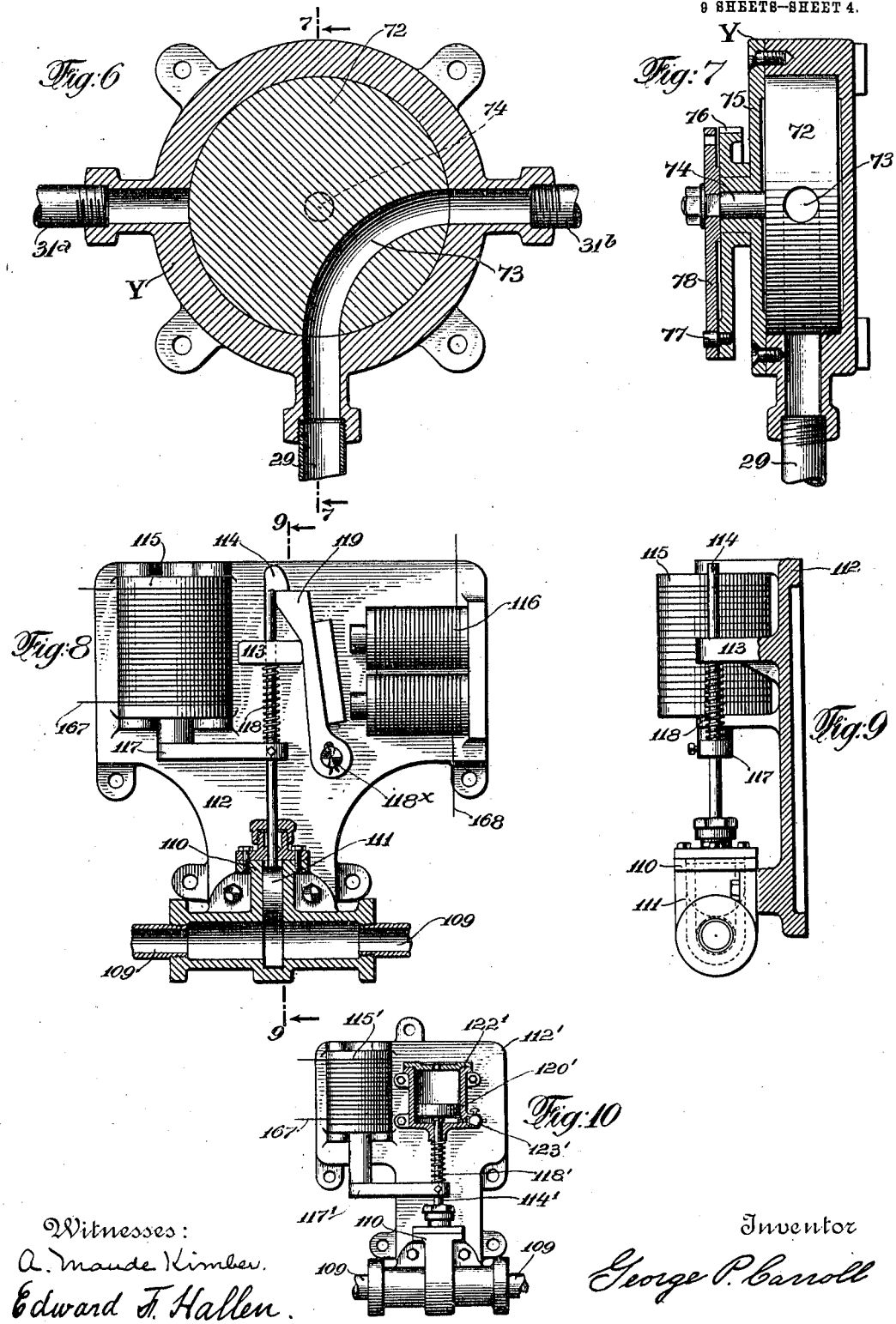

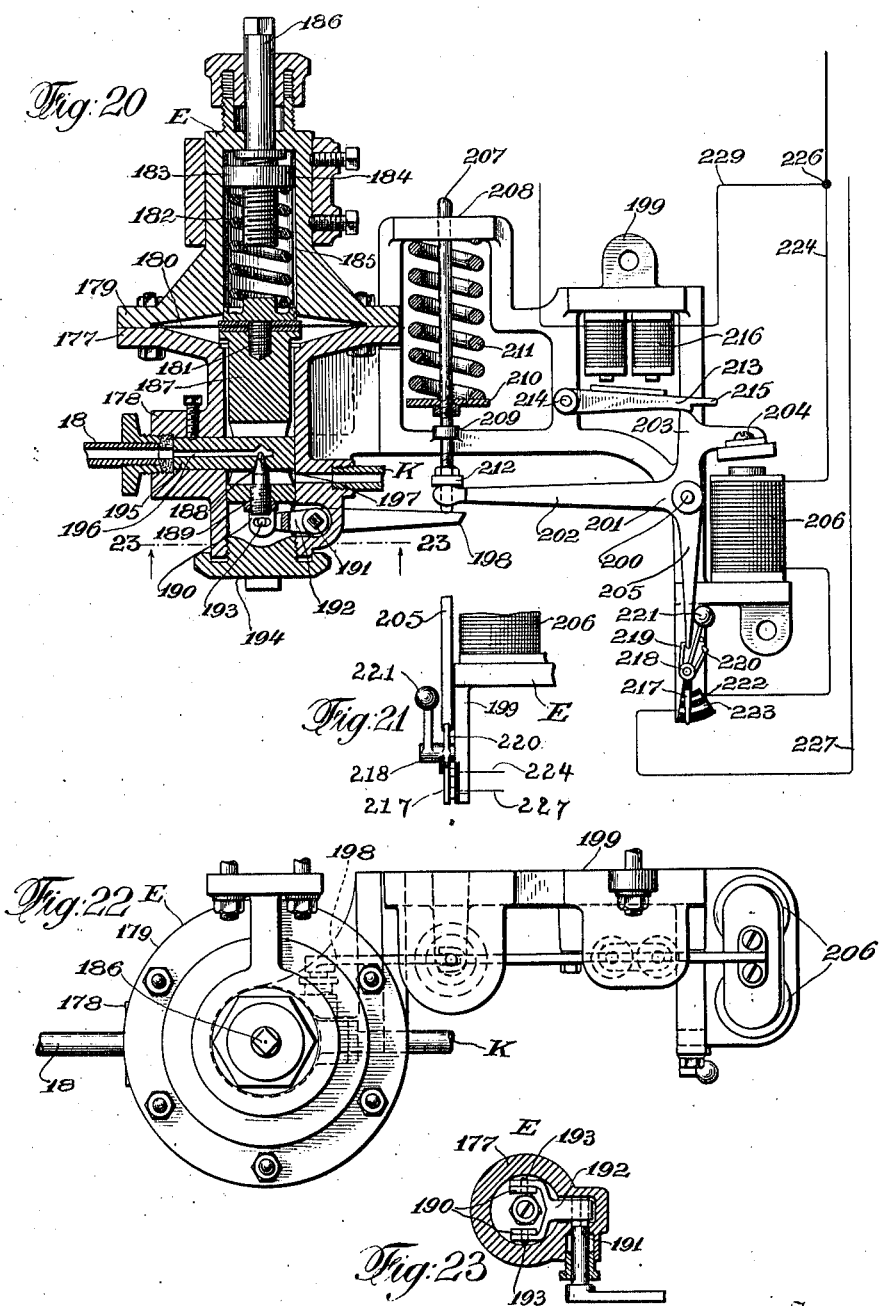

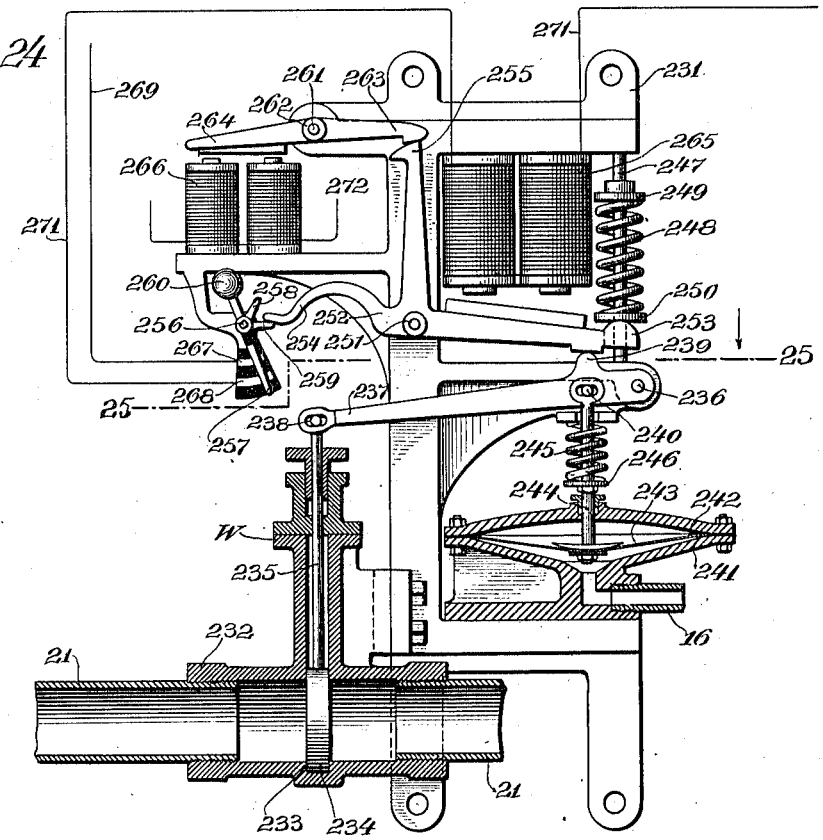
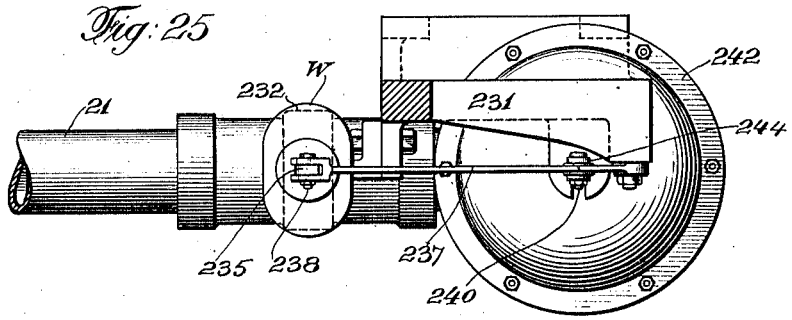

G. P. CARROLL.
AUTOMATIC ABSORPTION REFRIGERATING SYSTEM.
APPLICATION FILED JULY 20, 1907.
978,557.
Patented Dec. 13, 1910.
9 SHEETS—SHEET 9.
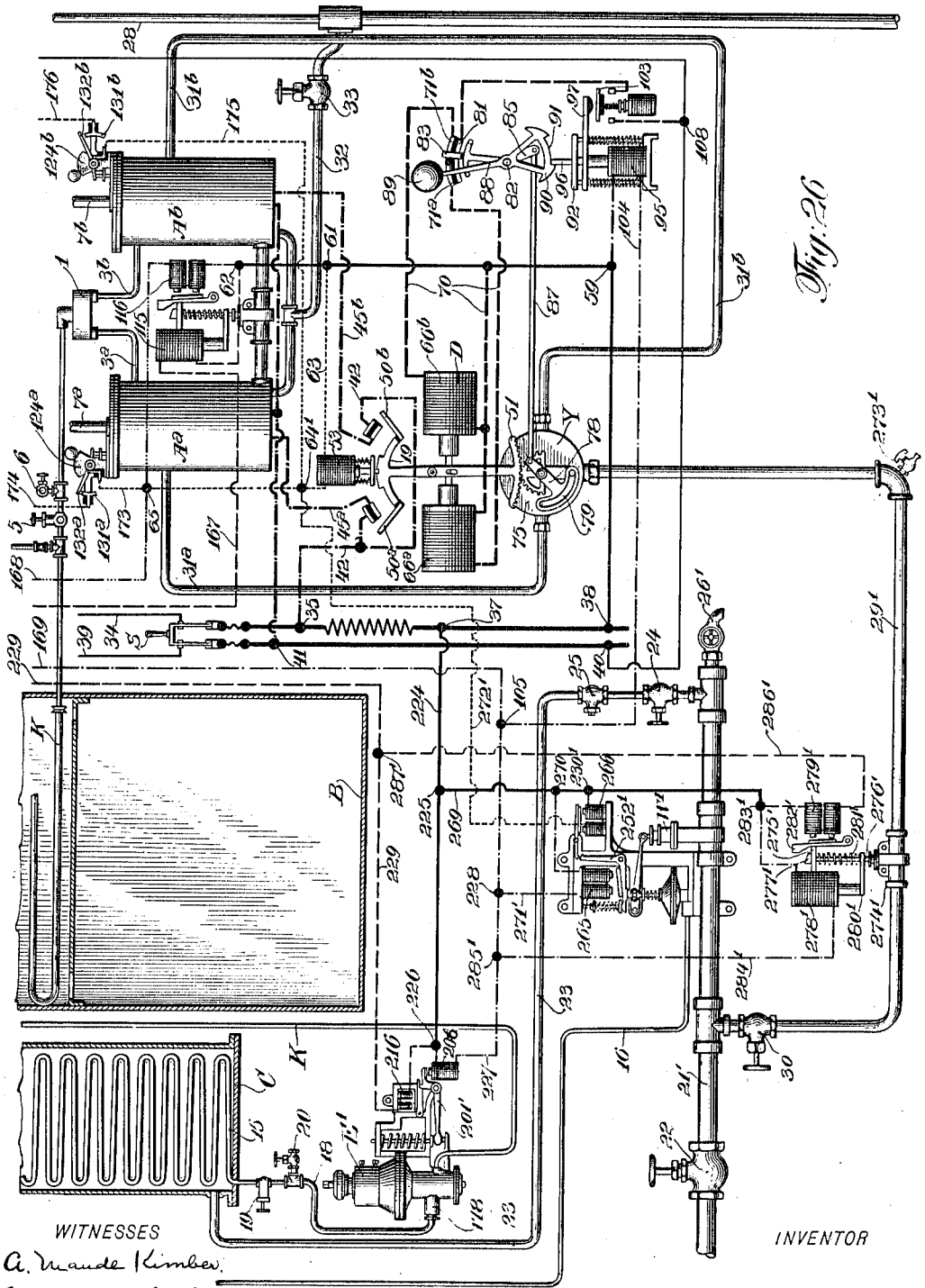
WITNESSES
A. Maude Kimber
Edward F. Hallen
INVENTOR
George P. Carroll

UNITED STATES PATENT OFFICE.

GEORGE P. CARROLL, OF BRIDGEPORT, CONNECTICUT.

AUTOMATIC ABSORPTION REFRIGERATING SYSTEM.

978,557.  Specification of Letters Patent.  Patented Dec. 13, 1910.

Application filed July 20, 1907. Serial No. 384,695.

*To all whom it may concern:*

Be it known that I, GEORGE P. CARROLL, a citizen of the United States, residing at Bridgeport, in the county of Fairfield and State of Connecticut, have invented a new and useful Automatic Absorption Refrigerating System, of which the following is a specification.

My invention relates to improvements in absorption refrigerating systems, especially those of small capacities adapted for household use, where not merely the attendance of an engineer would be impracticable, but where also the inclusion in the system of an electric motor and compressor, with their rapidly moving parts, would be prohibitive by reason of their first cost and the danger to unskilled persons.

The invention includes means for automatically heating and cooling in alternation each of a plurality of receptacles used successively as stills and absorbers, for automatically controlling the expansion and condenser valves, and for automatically maintaining a substantially uniform temperature in the refrigerator box. Preferably the system is throughout electrically actuated and is electrically heated. As in all refrigerating systems of the absorption type, the system is constructed to contain and use one substance as a refrigerant and another substance as an absorbent of the refrigerant. While other materials may be used, I prefer to employ ammonia as the refrigerant and water as the absorbent; and, as these substances are most commonly used in absorption systems, they will be hereinafter referred to as typical of all.

In the drawings Figure 1 is a diagrammatic view of my invention showing the operative relations of the various parts. Fig. 2 is a vertical section of a moisture separator and absorber-stills with connections and an elevation of a shifting device shown in the preceding figure, all these parts being intended to be secured in practice flatwise against the right side of a refrigerator there shown diagrammatically. Fig. 3 is a front elevation of the shifting device shown in the preceding figure, with the movable parts in a different position. Fig. 4 is a vertical section of the structure shown in the preceding figure through the line 4—4 looking toward the left. Fig. 5 is a vertical section of the same structure through the line 5—5 looking toward the right. Fig. 6 is a front vertical section of a three-way valve. Fig. 7 is a vertical section of the same valve through the line 7—7 of the preceding figure looking toward the left. Fig. 8 is a partial elevation and partial vertical section of an equalizing valve. Fig. 9 is a vertical section of the same valve through the line 9—9 of the preceding figure looking toward the left. Fig. 10 is a front elevation and partial vertical section of a modification of the same valve. Fig. 11 is a thermostat in front elevation and part of its connected absorber-still in section. Fig. 12 is a side elevation of the same thermostat. Fig. 13 is a horizontal section of the same thermostat and a top view of part of its connected absorber-still as seen through the line 13—13 of the same figure. Fig. 14 is a side elevation of an enlarged contact plate, showing the position at rest of its contact arm both above and below the plate. Fig. 15 is a thermostat in front elevation and part of its connected refrigerator in section. Fig. 16 is a side elevation of the structure of the preceding figure. Fig. 17 is a side elevation of an enlarged contact plate showing the position at rest of its contact arm both below and above the plate. Fig. 18 is a horizontal section of the thermostat of the same figure as seen through the line 18—18. Fig. 19 is a back elevation of the same enlarged contact plate with its adjacent supporting arm, showing the position at rest of its contact arm both below and above the plate. Fig. 20 is a partial vertical section and partial front elevation of an automatic expansion valve. Fig. 21 is a side elevation of a switch and connected parts. Fig. 22 is a top view of the valve structure. Fig. 23 is a horizontal section of the valve shown in Fig. 20 through the line 23—23 looking from beneath. Fig. 24 is a partial vertical section and partial front elevation of an automatic water valve. Fig. 25 is a horizontal section of the same structure as seen through the line 25—25. Fig. 26 is an alternative construction of a part of what is shown in Fig. 1.

The system may be used to refrigerate inclosures of indefinitely large size; but as it is especially intended for small compartments, the drawings and description are made more appropriate to an ordinary domestic refrigerator. An expansion coil K is convoluted in the upper compartment of a refrigerator B with its inlet and outlet ends projecting from opposite sides. It is arranged for a downward feed so that there is a decline from its entrance into the refrigerator all the way into the absorber-stills, to be described. The coil may refrigerate the air directly or may cool brine in a tank. The latter method permits of a longer shutting down between the times of operation.

The outlet end of the coil emerges from the refrigerator, being intermediately provided with a low pressure gage L, and leads into an inlet header 1 having two check valves $2^a$ and $2^b$, to prevent the return of the gas, whence two pipes $3^a$ and $3^b$ pass into two upright cylindrically shaped absorber-stills $A^a$ and $A^b$, traversing them centrally for most of their height and terminating a little above two electrical heaters $4^a$ and $4^b$, preferably placed inside and near their lower ends. These electrical heaters are of a well known type that can be used equally well with a direct or with an alternating current. Their insulation is such as to be unaffected by aqua ammonia. Between the gage L and the inlet header 1 is placed a stop valve 5 and between the stop valve and the header is placed a tee, from which a short pipe proceeds upward into the outer air, provided with a charging valve 6. The absorber-stills may be secured say to the right side of the refrigerator near the floor by means of a suitable bracket. From the top of each absorber-still proceeds upward a pipe $7^a$ and $7^b$ into an outlet header 8, provided at each end on the under side with check valves $9^a$ and $9^b$ to prevent the return of gas. From the outlet header a connection leads upward into a moisture separator M, preferably consisting of an analyzer Z and a rectifier R immediately above the analyzer, both of which are made narrow and are fastened flatwise against the side of the refrigerator above the absorber-stills. The analyzer is an inclosed tank provided with any approved form of baffle plates 10 so arranged as to retard the impinging heated gas as it ascends, thereby separating from the gas the entrained moisture and allowing it to drain back into the outlet header and into whichever absorber-still is in action as a still. From the analyzer, leading into the rectifier, is an upwardly ascending zigzag pipe 11, inclosed in the rectifier, which may consist of a tank and the ascending pipe with their connections.

Considered in connection with the absorber-stills, the moisture separator M is a part of means for expelling absorbed gas; but considered in connection with the condenser, to be described, it is a part of the means for condensing the expelled gas.

From the rectifier a pipe 12 passes above or preferably back of the refrigerator to a condenser C. At the top of the gas pipe system just after leaving the rectifier is placed in the pipe a stop valve 13 and between the stop valve and the rectifier is placed a tee, from which a short pipe proceeds into the outer air, provided with a purge valve 14. The condenser may consist of a narrow tank containing a pipe 15 zigzagging downward, with their connections, the tank being intended to be secured to the left side of the refrigerator and thus opposite the absorber-stills. A branch pipe 16, provided with a stop valve 17, leads from the pipe 12 and has a branch leading to a high pressure gage H. The lower part of the condenser pipe is intended to serve as a container for the condensed and liquefied ammonia so as to dispense with a separate vessel. From the lower end of the pipe 15 a liquid pipe 18, which may be smaller, passes out of the tank 15 to an automatic expansion valve E. The expansion coil K leads from the valve E; and in practice this valve is placed close to the refrigerator with only a short length of pipe leading into it. Between the tank and the valve E is placed a hand valve 19; and from between the valve 19 and the valve E a branch pipe leads into the outer air, in which is placed a vacuum valve 20.

From a source of cool water supply leads a pipe 21, provided with a hand valve 22 and beyond that with an automatic water valve W. Beyond the valve W the pipe 21 branches. One branch pipe 23 is provided with a regulating valve 24, a check valve 25 and a condenser drain valve 26; it leads to the bottom of the condenser C. From the top of the condenser a pipe 27 leads to the rectifier R. From the rectifier a waste pipe 28 leads to the sewer. From the pipe 21 another branch pipe 29, provided with a regulating valve 30, leads to a three-way valve Y, bolted to the casing of a shifting device D, which is intended to be bolted to the right side of the refrigerator in any convenient place. From the valve Y one sub-branch pipe $31^a$ leads into the absorber-still $A^a$ at a distance say two-thirds of the way from the bottom, enspirals the pipe $3^a$ downwardly, and passes out of the bottom of the absorber-still. From the valve Y another sub-branch pipe $31^b$ leads to the absorber-still $A^b$ also say two-thirds of the way from the bottom, enspirals the pipe $3^b$ downwardly, and passes out of the bottom of the absorber-still. The pipes $31^a$ and $31^b$ may unite in a pipe 32, which is provided with a stop valve 33 and leads into the waste pipe 28. In practice it is better not to have the pipes $31^a$ and $31^b$ unite at their exits from the absorber-stills; but to provide each with a separate stop valve, and to let them flow into the open so that the quantities of their respective discharges can be seen and regulated.

A feed wire 34 from a source of electric power such as an electric generator, not shown, as at a central power station, passes through a point 35, a resistance 36, a point 37, and to a point 38 and beyond. The return wire 39 passes from beyond and through the points 40 and 41. A hand switch S is adapted to make and break connections in the wires between the generator and the points 35 and 41. From the point 35 a heating wire 42 branches to contacts 43ª and 43ᵇ. From a contact 44ª, insulated from the contact 43ª, a branch heating wire 45ª leads to the heater 4ª and thence to the point 41. From a contact 44ᵇ, insulated from the contact 43ᵇ, a branch heating wire 45ᵇ leads to the heater 4ᵇ and thence unites with the wire 45ª to the point 41. All four contacts are arcs of a common circle and are secured to but are insulated from the casing of the shifting device D.

A boss 46 having an axial bore is secured to the front of the casing of the shifting device D. Pivoted on a bolt 47 passing through the bore of the boss and having a suitable securing nut at its front end is a lever 48, ending in an upper sector 49 having two contact arms 50ª and 50ᵇ insulated from the sector at their lower ends. The upper part of the contact arm 50ª is adapted to make a sliding contact with and to connect the contacts 43ª and 44ª. The upper part of the contact arm 50ᵇ is adapted to make a sliding contact with and to connect the contacts 43ᵇ and 44ᵇ. The upper sector 49 on its upper side is in the form of a double detent at the left and right of the axis of the lever 48 and has an engaging recess in its upper center. The lever 48 just below its pivot is slotted both from left to right and from its front into the first slot, the second slot being vertical. The lower extremity of the lever ends in a segment gear 51. Spiral springs 52ª and 52ᵇ secured to the casing tend to keep the lever in a vertical position.

Mounted on the casing of the shifting device D at its extreme top is a solenoid 53, having a core 54 normally depressed by springs 55. When depressed the core 54 is adapted either to engage with the left detent of the sector 49 so as to hold the contact arm 50ª in contact with the contacts 43ª and 44ª, as shown in Fig. 3; or to engage with the right detent of the sector so as to hold the contact arm 50ᵇ in contact with the contacts 43ᵇ and 44ᵇ; or to engage with the central recess of the sector so as to hold the lever 48 vertical, as shown in Figs. 1 and 2. From the point 38 a branch line 58 passes through points 59, 60 and 61 to a point 62. From the point 61 a branch line 63 passes to and through the solenoid 53 through a point 64 to a point 65.

Also mounted on the casing of the shifting device D are two solenoids 66ª and 66ᵇ, both horizontal and secured respectively on the left and right of the lever 48. The solenoid 66ª has a core 67ª and the solenoid 66ᵇ has a core 67ᵇ. A link 68, joining the cores, passes from left to right through the corresponding slot in the lever 48 and has a pin 69 projecting through the front slot of the lever. From the point 60 a branch line 70 passes and divides into two branches passing through the solenoids 66ª and 66ᵇ respectively and leading to contacts 71ª and 71ᵇ respectively.

The casing of the three-way valve Y is mounted on the lower part of the casing of the shifting device D. A plug 72 has a quadrant channel 73 and is adapted when rotated to permit of a free passage, through its channel and through the openings in the valve casing, between the pipes 29 and 31ª and between the pipes 29 and 31ᵇ in alternation. The plug 72 is secured to a shaft 74 journaled in the back part of the casing and passing out through a disk cover 75 inclosing the plug in the casing. The center of the cover is a cylindrical boss with an axial bore. Rotating somewhat loosely on this boss and meshing with the segment gear 51 is a half gear wheel 76, which has an arm extending radially on the opposite side of its center and having inserted in its outer end a pin 77 projecting frontward. Secured to the outer end of the shaft 74, which is squared for that purpose, is a quadrant lever 78 having at its lower end on one side of the shaft a quadrant slot 79, in which the pin 77 loosely fits and is free to move, and at its upper end on the opposite side of the shaft a pin 80 projecting frontward. The quadrant lever is also secured to the shaft 74 by a suitable nut.

The parts are so constructed that when the lever 48 passes to a vertical position from an extreme inclined position as shown in Fig. 3, with the contact arm 50ª connecting the contacts 43ª and 44ª and with the quadrant slot 79 positioned as there shown, the half gear wheel 76 is rotated through a quarter circle to the position shown in Figs. 1 and 2 and the pin 77 moves in the quadrant slot 79 without moving the quadrant lever 78. So when the lever 48 passes to a vertical position from an extreme inclined position with the contact arm 50ᵇ connecting the contacts 43ᵇ and 44ᵇ and with the quadrant slot 79 positioned as shown in Figs. 1 and 2, the half gear wheel 76 is rotated through a quarter circle to the position there shown and the pin 77 moves in the quadrant slot 79 without moving the quadrant lever 78. Furthermore the assembling of parts is such that when the quadrant slot 79 is in the position shown in Figs. 1 and 2, the quadrant channel 73 registers with the pipes 29 and 31ª; but when it is in the position shown in Fig. 3, the quadrant channel registers with the pipes 29 and 31ᵇ, as shown in Fig. 6.

The contacts 71ᵃ and 71ᵇ are secured to but are insulated from the front of the right side of the casing of the shifting device D. Immediately below them and insulated from them and from the casing to which it is secured is a contact 81. All three contacts are arcs of a common circle having as its center a shaft 82 journaled at its back in the casing. A contact arm 83 is pivoted at one end on the shaft 82, has an intermediate cross arm with limit pins 84ᵃ and 84ᵇ projecting frontward, and has its upper end insulated from its cross arm and adapted to make contact with the contacts 71ᵃ and 81 and 71ᵇ and 81 in alternation. Pivoted on the shaft 82 in front of the contact arm 83 is a lever 85 extending downward having a pin 86 at its lower extremity extending frontward. A connecting rod 87 is pivoted at its ends to the front of the pin 80 and to the back of the pin 86. In front of the lever 85 and pivoted on the shaft 82, being kept thereon by a suitable nut, is a weighted lever 88, having a weight arm extending upward and ending in a small globular weight 89 and a hollow triangle 90 extending downward. The pin 86 is free to move within the triangle and to engage its upper inner sides in alternation. The outside edge of the lower side of the triangle is nearly semicircular except that it has a broad central recess forming a double detent 91.

Mounted on the casing of the shifting device D below the triangle 90 is a bracket 92 projecting frontward and supporting the inserted tops of two vertical rods 93ᵃ and 93ᵇ, enspiraled by springs 94ᵃ and 94ᵇ and supported at their bottom by a corresponding bracket which is removable. The bracket 92 has a perforated stop boss on its central under side. Mounted on the same casing is a solenoid 95 having a core 96 adapted at its top for engagement with either side of the double detent 91 and with either side of the triangle 90 outside of the detent and having a shoulder on its lower part. A cross piece 97, having an insulated boss on its lower right side, is bored so that the rods 93ᵃ and 93ᵇ and the core 96 are passed through the bores in assembling the parts, the shoulder of the core being too large to pass through. The cross piece is secured to the core. When the parts are in their upward positions either they have, as shown in either of the first three figures, the top of the core 96 resting in the double detent 91, the cross piece 97 resting against the stop boss of the bracket 92 and the springs 94ᵃ and 94ᵇ supporting the cross piece and bore in position; or else the parts are in the same upward position but the top of the core 96 engages with the triangle 90 outside of and to the left or right of the detent 91. Also secured to the casing is a dash pot 98 and two insulated and conducting contact stops 99ᵃ and 99ᵇ. The dash pot consists of the usual cylinder, with vents top and bottom the former vent being controlled by a pet cock 100, containing a piston rod 101, with a spring 102 enspiraling the rod and abutting at one end against the outside top of the cylinder and at the other end against a conducting cross piece 103 insulated from the piston rod and spring. This latter cross piece at its highest position abuts against the insulated boss of the cross piece 97 and at its lowest position rests on the contact stops 99ᵃ and 99ᵇ. From the point 59 a line 104 passes to and through the solenoid 95 to a point 105. From the contact 81 a line 106 passes to the stop 99ᵇ; and from the stop 99ᵃ a line 107 passes through a point 108 to the point 40.

An equalizing pipe 109 connects the bottom of the absorber-stills Aᵃ and Aᵇ and is provided midway with a chamber 110 containing an equalizing valve 111, preferably of the gate valve type. The chamber may be bolted to a casing 112 as in Fig. 8, which itself can be bolted to the side of the refrigerator between the absorber-stills. Secured to the casing 112 is a perforated bracket 113 through which a valve stem 114 passes, ending in a tooth at its upper end for engagement on its under side, passing through a suitable stuffing box in the chamber 110 and secured at its lower end to the valve. Also secured to the casing 112 is a vertical solenoid 115 and a horizontal electro-magnet 116. The core of the solenoid is provided with a horizontal arm 117, perforated at its outer end for the passage therethrough of the stem 114, to which the arm is adjustably secured by a set screw. A spring 118 enspirals the stem 114 and abuts at its top against the under side of the bracket 113 and at its bottom against the upper side of the arm 117. Pivoted at its lower end on a pin 118ˣ, projecting from the casing 112, is a detent 119, having an armature on its right side adapted to be acted upon by the electro-magnet 116. The detent is so constructed and positioned that it normally rests against the right side of the bracket 113 and engages and locks in a lifted position the tooth of the stem 114 whenever the tooth is above the top of the detent; but when the electro-magnet 116 is energized the detent is momentarily drawn to the right and releases the tooth.

In Fig. 10, in which similar parts are indicated by primes, the stem 114′ ends at its top in a piston 120′ inclosed in a dash pot cylinder 122′. The cylinder has vents top and bottom, the latter being provided with a pet cock 123′. The spring 118′ abuts at its top against the under side of the cylinder 122′.

Inserted through the top of the absorber-still A^a is the lower end of a thermostat 124^a. This lower end is in the shape of a cylindrical chamber having a globular enlargement at its lower extremity adapted to contain mercury 125^a or any sufficiently expansible fluid. After the mercury or other fluid has been supplied from above, its height in the chamber can be regulated by means of a threaded bolt 126^a fitted to an aperture in the bottom of the chamber and secured in place by a lock nut 127^a. Journaled in the upper part of the casing 128^a of the thermostat is a shaft 129^a. The casing extends to the left in Fig. 11 in an extension 130^a projecting frontward at its end as a support for an insulated contact plate 131^a, having its insulated contact in front. Secured to the shaft 129^a in front of the casing 128^a but insulated from it is a spring contact arm 132^a, operative to engage and make contact with the contact of the plate 131^a on its way down and to go back of the plate on its way up. The contact plate is beveled so that the spring contact arm is automatically so contactual and non-contactual on its descent and ascent respectively. Secured to but insulated from the casing 128^a is a spring contact 133^a, operative to keep in contact with the arm 132^a in whatever position the latter may be. Secured to the shaft 129^a back of the casing 128^a is a weight arm ending in a small globular weight 134^a at its top and having two limit arms 135^a and 136^a projecting on its right side. Pins 137^a and 138^a, projecting backward from the casing 128^a, limit the movement of the arm 134^a. Through a collar 139^a, made a part of the casing 128^a, passes a rod 140^a which fits with a piston fit in the narrow cylindrical part of the chamber of the thermostat above the mercury 125^a and has a horizontal cross piece 141^a at its top adapted to make engagement with the limit arms 135^a and 136 successively. In an outside pocket of the chamber above its narrow part rests a collar 142^a, detachably secured to the rod 140^a by a set screw. A spring 143^a enspirals the rod 140^a and abuts at its top on the under side of the collar 139^a and at its bottom on the upper side of the collar 142^a.

Inserted through the top of the absorber-still A^b is the lower end of a thermostat 124^b; it has a contact plate 131^b, a spring contact arm 132^b, a spring contact 133^b and all other parts constructed and operative in the same way as the corresponding parts of the thermostat 124^a.

Inserted through the wall of the refrigerator B is the inner end of a thermostat T. This thermostat may be, if preferred, inclosed entirely in the chamber by the temperatures of which it is controlled. The inner end of the thermostat is in the form of a chamber narrow and cylindrical at its central part and adapted for the reciprocation therethrough of a piston fitting rod 144 having at its other extremity a horizontal cross piece 145 extending backward. The inner end of this chamber has a depending enlargement adapted to contain mercury 146 or the same kind of expansible fluids as the other thermostats. After the mercury or other fluid has been supplied from the outer end, its height in the chamber can be regulated by means of a threaded bolt 147 fitted to an aperture near the bottom of the chamber and secured in place by a lock nut 148. Journaled in the upper part of the casing 149 of the thermostat is a shaft 150. The casing extends to the right in Fig. 15 in an extension 151 projecting frontward at its end as a support for an insulated contact plate 152, having in front insulated contacts 153, 154 and 155 and at back an insulated contact 156. Secured to the shaft 150 but insulated from it is a spring contact arm 157, operative to engage and make sliding contact with the contacts 155, 154 and 153 successively on its way up and with the contact 156 on its way down. The contact plate is beveled so that the spring contact arm is automatically so contactual on its ascent and descent. Secured to but insulated from the casing 149 is a spring contact 158, operative to keep in contact with the arm 157 in whatever position the latter may be. Secured to the shaft 150 back of the casing 149 is a weight arm ending in a small globular weight 159 at its top and having two limit arms 160 and 161 on the opposite side of the shaft. The central lines of the arm 157 and of the weight arm 159 are at right angles to each other; and contact is made between the arm 157 and the contact 155, the latter being so located, before the weight 159 gets past the vertical center of its pivot in a movement to the left as seen in Fig. 15. Pins 162 and 163, projecting backward from the casing 149, limit the movement of the arm 159. Through the collar 164, made a part of the casing 149, passes the outer end of the rod 144 so that its cross piece 145 is adapted to make engagement with the limit arms 160 and 161 successively. In an outside pocket of the chamber to the right of the narrow part rests a collar 165, detachably secured to the rod 144 by a set screw. A spring 166 enspirals the rods 144 and abuts at its outer end against the left side of the collar 164 and at its inner end against the right side of the collar 165.

From the point 62 a line 167 passes through the solenoid 115 to the contact 155. From the point 62 a line 168 passes through the electro-magnet 116 and the point 65 to the contact 154. From the point 105 a line 169 passes to the contact 153. From the spring contact 158 a line 170 passes through points 171 and 172 to the point 108. From the point 65 a line 173 passes to the spring contact 133ª. From the contact plate 131ª a line 174 passes to the point 171. From the point 64 a line 175 passes to the spring contact 133ᵇ. From the contact plate 131ᵇ a line 176 passes to the point 172.

In the automatic expansion valve E a lower casing 177 has cast as a part thereof a perforated lateral entrance boss 178 and a perforated outlet into which the expansion coil K is fitted. Superimposed upon it is an upper casing 179 correspondingly flanged so as to hold a diaphragm 180 between the flanges bolted together. The diaphragm is so flexible or resilient that at the center it can be moved up or down while its periphery remains stationary. Extending centrally through the diaphragm is a screw 181, its top above the diaphragm being in the form of an annular pocket for receiving the lower end of a coiled spring 182. The thrust exerted by the spring is regulated by the elevation or depression above the spring of a collar 183, which is held from turning by a tongue 184 fitting into a vertical groove 185. Threaded into the collar 183 is an adjusting screw 186, which extends up through a suitable stuffing box and gland and is provided at its upper end with a wrench section for turning the screw when it is desired to adjust the thrust of the coiled spring 182 upon the diaphragm 180.

Threaded on the screw 181 is a slotted bar 187; it is guided by the walls of the lower casing, but fits somewhat loosely therein. By this loose fit a sufficient space is left so that gas can pass up between the bar and the casing and impinge against the under side of the diaphragm 180. Threaded into the slotted bar 187 and extending upward into its slot is a valve 188, preferably of the conical or needle valve type, which is locked in place at its lower end by a lock nut 189. Lugs 190 depend from the slotted bar on each side of the lock nut and are horizontally slotted at their lower ends. Near the bottom of the lower casing 177 below the outlet is a recess perforated at the back and provided with a suitable stuffing box and gland for the passage of a lever shaft 191. The end of the shaft within the recess is squared for the securing thereto of an inner lever 192, extending horizontally. This lever has a forked extremity near the axis of the lower casing 177, each branch carrying a pin 193 which is extended into the corresponding slots of the lugs 190. A bottom cap 194 is screwed on to the lower end of the lower casing 177. The upper casing 179 may be supported and fastened to the left side of the refrigerator by a suitable bracket.

An entrance piece 195 rests in the perforation of the lateral entrance boss 178 for a part of its length so that its inner end abuts against the inner wall of the lower casing 177, preferably above the outlet. This entrance piece is preferably a solid rod of comparatively large diameter bored out centrally from its outer end up to a place that will be in the axial center of the casings, making a bore 196. Thence the piece has a downward bore at right angles to the other bore, ending in a conical valve seat 197 on its under side, upon which the valve 188 can be seated. The part of the entrance piece projecting inside the casing has its sides and bottom surface plane so as to loosely fit the slot of the bar 187 and so as to afford a suitable valve seat for the valve 188. The entrance piece may be kept in place by a set screw or may be keyed in place. The liquid pipe 18 enters the outer end of the lateral entrance boss 178 so as to lead to the bore 196 and is held in place and so as to prevent leakage by a suitable gland and packing.

To the outside end of the lever shaft 191 is secured an outer lever 198, extending in a horizontal direction opposite to that of the inner lever. A frame 199 is provided with suitable screw or bolt holes for attaching it to the refrigerator and is made to abut against an extension of the lower casing 177. Pivoted on the frame at 200 is a three-part lever 201 having its main arm 202 extending horizontally toward and terminating in a position just above the outer end of the outer lever 198. Substantially at right angles to the main arm an upper arm 203 extends upward having on the side opposite to the main arm a projecting arm 204 with an armature on its under side; and also a lower arm 205 extends downward from the pivot 200. Resting on a suitable projection from the frame 199 and immediately under the armature of the projecting arm 204 is an electro-magnet 206, which, when energized, depresses the projecting arm. A vertical rod 207 passes through annular guides 208 and 209 in the upper and lower parts of the frame; above the guide 209 it is threaded for the longitudinal adjustment of a disk and lock nut 210. A coiled spring 211 enspirals the rod 207 and abuts at its top against the under side of the guide 208 and at its bottom against the upper surface of the disk, which determines the thrusting force of the spring according to its longitudinal position. The coiled spring 211 is constructed so as to have a greater thrusting force than the coiled spring 182. The rod 207 is threaded below the lower guide 209 and near its lowest extremity for the longitudinal adjustment of a small disk and lock nut 212; and below the disk and lock nut its lower extremity passes through an eye in the outer extremity of the main arm 202 so as to bear upon the outer upper face of the outer lever 198. The longitudinal position of the disk and lock nut 210 determines, when the main arm 202 is depressed, the force of the depression of the outer lever 198 and the consequent force with which the inner lever 192 is elevated and the valve 188 is forced to its seat. The longitudinal position of the disk and nut 212 determines, when the main arm 202 is elevated, the lift of the rod 207 and the consequent lift of the valve 188.

A dog 213, having an armature on its upper side, is pivoted at one end at 214 on the frame 199 and has at its other end a tooth 215, which rests on top of the upper arm 203 when the main arm 202 is depressed and the upper arm is consequently rotated to the left. But when the main arm is elevated, the upper arm is rotated to the right and is engaged and locked by the tooth 215. An electro-magnet 216 is supported from above by a suitable projection from the frame 199 and, when energized, it lifts the dog 213 and thus disengages the upper arm 203.

A switch arm 217 is pivoted at 218, with proper insulation, on the frame 199; it has two limit arms 219 and 220 and also a weight arm intermediate between them and ending in a small globular weight 221. Both these limit arms are adapted in turn to be engaged by the lower end of the lower arm 205 as it is moved to the left by the elevation of the main arm 204 and to the right as it is depressed. Contacts 222 and 223 are insulated from each other and from the frame 199, on which they are supported, and are adapted to make contact with the switch 217 when the weight 221 is at the right as shown in Fig. 20. From the point 37 a line 224 passes through points 225 and 226 and the electro-magnet 206 to the contact 222. From the contact 223 a line 227 passes through a point 228 to the point 105. From the point 226 a line 229 passes through the electro-magnet 216 and a point 230 to the contact 156.

In the automatic water valve W a frame 231, which is provided with suitable screw or bolt holes for attaching it to the refrigerator, has bolted or otherwise attached to it a valve casing 232, having near its center a vertical valve seat 233 and adapted for the reception into its ends of parts of the pipe 21. Adapted to occupy the valve seat 233 is a valve 234, preferably of the gate valve type, having a stem 235 extending up through a suitable stuffing box and gland bolted or otherwise secured to the top of the casing. Pivoted to the frame 231 at 236 is one end of a horizontal lever 237, having its outer end forked and horizontally slotted for the reception of a pin 238 passed through a head at the upper end of the stem 235 and through the slot in each fork. On the upper side of the lever not far from the pivot 236 is a projection 239 and beneath it extending horizontally is a slot for the passage of a pin 240.

Attached to or cast as one piece with the frame 231 is a flanged lower casing 241 having a passage into which is connected the pipe 16. Superimposed upon the lower casing is a flanged upper casing 242 so as to inclose between the two flanges and to hold by bolts or otherwise a diaphragm 243. This diaphragm is flexible or resilient like that of the valve E. Passing centrally through the upper casing 242, where it is provided with a suitable stuffing box and gland, is a stem 244, passing near its lower end through the center of the diaphragm where it is provided with suitable washers on both sides of the diaphragm and a lock nut for distributing the push or pull on the diaphragm and for holding the stem in place; the stem is also forked and horizontally slotted at its top for the passage of the pin 240. A coiled spring 245 enspirals the stem 244 and abuts at its top against a part of the frame 231 and at its bottom against the upper side of a disk and lock nut 246 adapted for longitudinal adjustment on the stem 244.

A vertical rod 247 is inserted top and bottom into separate parts of the frame 231 and is enspiraled by a coiled spring 248, stronger than the coiled spring 245. The coiled spring 248 abuts at its top against a disk and lock nut 249 longitudinally adjustable on the rod 247 and at its bottom against a disk 250, free to move up or down on the rod. Pivoted to the frame 231 at 251 is a three-part lever 252. Extending longitudinally from the pivot is a main arm 253 having an eye at its outer extremity through which the rod 247 is inserted so as to bring the disk 250 above the extremity of the arm. The parts are so located that a lower face on the main arm near its outer extremity is adapted to rest on top of the projection 239. The upper side of the main arm is provided with an armature. From the pivot 251 a short arm 254 extends horizontally in a direction opposite to that of the main arm 253 and an upper arm 255 extends upward, ending in a sloping face.

Pivoted at 256 to a properly insulated extension of the frame 231 is a switch 257, having two limit arms 258 and 259 extending to the right and adapted to make contact in alternation with the outer end of the short arm 254. Extending upward from the pivot 256 in an opposite direction from the switch 257 is a weight arm ending in a small globular weight 260. Pivoted at 261 on the frame 231 is a two-arm lever 262 having a right arm 263 with a tooth at its outer end adapted to engage with the upper arm 255 so as to lock the same or so as to rest on its sloping face when the upper arm is unlocked. Extending horizontally from the pivot 261 in a direction opposite to that of the right arm is a left arm 264, having an armature on its under side.

Secured to the frame 231 and depending therefrom so as to be immediately over the armature of the main arm is an electro-magnet 265. Resting on a projection of the frame and immediately under the armature of the left arm 264 is an electro-magnet 266. Contacts 267 and 268 are insulated from each other and from the frame 231, on which they are supported, and are adapted to make contact with the switch 257 when the weight 260 is at the left as shown in Fig. 24. From the point 225 a line 269 passes through a point 270 to the contact 267. From the contact 268 a line 271 passes through the electro-magnet 265 to the point 228. From the point 270 a line 272 passes through the electro-magnet 266 to the point 230.

The method of operation is as follows: It is assumed that it is desired to maintain in the refrigerator B some temperature ranging for instance say between 35° and 38° F. The parts of the thermostat T are proportioned and adjusted and a sufficient quantity of the mercury 146 is supplied, the fine adjustment being made by the bolt 147 and the nut 148, so that, whenever the temperature in the refrigerator rises nearly to 38°, the mercury 146 forces the rod 144 outward far enough so that the cross piece 145, acting through the arm 161 and the shaft 150, brings the arm 157 in contact with the contact 155; then when the temperature rises to 38°, the center of the arm 157 passes above the center of the extension 151. Just at this time the center of gravity of the weight 159 passes to the left of the center of the shaft 150. Thereupon gravity acts upon the weight 159 to carry it still farther to the left until it is stopped by the pin 162. As this movement is being made the arm 157 is brought in contact with the contacts 154 and 153 successively and then clears the plate 152 altogether so that it springs into the vertically central position above the plate indicated in Figs. 17 and 19 as 157′. Incidentally the arm 161 has been carried away from the cross piece 145 and the arm 160 has been brought near it. Whenever subsequently the temperature in the refrigerator falls nearly to 35°, the mercury 146 contracts sufficiently so that the spring 166 acting on the collar 165 forces the rod 144 and the cross piece 145 inward far enough for the cross piece to engage the arm 160. Then when the temperature falls to 35°, the arm 160 has been carried far enough to the left to bring, through the shaft 150, the center of gravity of the weight 159 to the right of the center of the shaft. Thereupon gravity acts upon the weight to carry it still farther to the right until it is stopped by the pin 163.

As this movement is being made the arm 157 is brought in contact with the contact 156 and finally clears the plate 152 altogether so that it springs into the vertically central position below the plate shown in Figs. 15, 17 and 19. The cycle of action of the thermostat T is thus complete.

Against a condenser pressure ranging from 150 to 180 lbs. only twelve to fourteen per cent. of ammonia in the solution will be retained in the absorber-stills when their temperatures are raised to 300°. Therefore, let this be chosen as the limiting temperature. The parts of the thermostat $124^a$ are proportioned and adjusted and a sufficient quantity of the mercury $125^a$ is supplied, the fine adjustment being made by the bolt $126^a$ and the nut $127^a$, so that, whenever the temperature in the absorber-still $A^a$ rises say nearly to 300°, the mercury $125^a$ forces the rod $140^a$ upward far enough so that the cross piece $141^a$, acting through the arm $135^a$ and the shaft $129^a$, brings the arm $132^a$ near to the contact $131^a$; and at the same time the center of gravity of the weight $134^a$ is brought almost over the center of the shaft $129^a$. Then when the temperature rises say to 300°, the center of gravity of the weight $134^a$ passes to the left of the center of the shaft $129^a$. Thereupon gravity acts upon the weight $134^a$ to carry it still farther to the left until it is stopped by the pin $137^a$. As this movement is being made the arm $132^a$ is brought in contact with the contact $131^a$ and then clears the contact plate altogether so that it springs into the vertically central position below the plate indicated in Fig. 14 as $132^{a\prime}$. Incidentally the arm $135^a$ has been carried away from the cross piece $141^a$ and the arm $136^a$ has been brought near it. Whenever subsequently the temperature in the absorber-still falls nearly to 300°, the mercury $125^a$ contracts sufficiently so that the spring $143^a$ acting on the collar $142^a$ forces the rod $140^a$ and the cross piece $141^a$ downward far enough for the cross piece to engage the arm $136^a$. Then when the temperature falls to 300°, the arm $136^a$ has been carried far enough downward to bring, through the shaft $129^a$, the center of gravity of the weight $134^a$ to the right of the center of the shaft. Thereupon gravity acts upon the weight to carry it still farther to the right until it is stopped by the pin $138^a$. As this movement is being made the arm $132^a$ passes to the rear of the plate $131^a$ without making any contact and then clears the plate altogether so that it springs into the vertically central position above the plate shown in Figs. 11 and 14. The cycle of action of the thermostat $124^a$ is thus complete. The cycle of action of the thermostat $124^b$ is precisely similar.

The range of temperature within which each of the thermostats acts is determined by the distance apart of the limit arms, such as 160 and 161. A rough adjustment of the thermostat, as to its upper or lower temperature limit, can be made by changing the position of the movable collar, such as 165, so as to force the rod 144 inward or outward; while the fine adjustment is made through the bolt 147 and the nut 148. It is obvious that if the volume of the chamber within which the mercury can expand is diminished, the thermostat will act between two higher temperature limits; and if the volume is increased, the two temperature limits are lowered. It is also assumed for the present that the absorber-stills A$^a$ and B$^b$ have been properly supplied with a strong solution of aqua ammonia and that the system has been operated so as to bring it into the condition of cold inaction shown in Figs. 1 and 2 with the temperature in the refrigerator standing at 35° and with a small quantity of anhydrous liquid ammonia in the lower part of the pipe 15. The switch S is also normally closed during the entire season the plant is in operation. The valves 5, 13, 17, 19, 22, 24 and 33 are open; and the valves 6, 14, 20 and 26 are closed. As the temperature rises toward 38° the arm 157 makes contact with the contact 155. Thereupon a current passes from the point 38 through the line 58, the point 62, the line 167 and the solenoid 115 to the contact 155; and thence through the arm 157, the spring contact 158, the line 170, the point 108 and the line 107 to the point 40 in the return line 39. As the solenoid 115 is energized it lifts its core and the arm 117 and also the stem 114 and the valve 111. Thereupon the detent 119 engages the tooth of the stem 114 and holds the valve 111 open so that the height of the liquor in the two absorber-stills is equalized. With a further slight rise of temperature the arm 157 passes from its contact with the contact 155; but the valve 111 remains open for the present by reason of the detent 119.

As the arm 157 is swung into contact with the contact 154 a current passes from the point 62 through the line 168 and the electro-magnet 116 to the contact 154; and thence through the arm 157 back to the return line 39 as before. As the electro-magnet 116 is energized it draws the detent 119 to the right and releases the stem 114. Thereupon the spring 118 acts upon the arm 117 so as to close the valve 111. It is obvious that the length of time that the valve 111 remains open depends in part on the rapidity with which the temperature rises in the refrigerator and in part on the width of the arm 157 and of the contact 155 and on the distance of this contact from the contact 154. By making the contact 155 adjustable on the plate 152 and moving it toward or away from the contact 154, the length of time that the valve remains open can be diminished or increased.

In the alternative construction shown in Fig. 10 the opening of the valve is accomplished in the same manner; but the length of its remaining open, after the arm 157 has ceased to be in contact with the contact 155, is determined by the regulation of the pet cock 123′. With each kind of device, the idea is to construct and assemble the parts so that the valve shall remain open long enough to secure a practical equalization of the height of the liquor in the two absorber-stills. Without some such regulation, as the system is operated, there might come to pass a condition where practically all the liquor would be in one absorber-still. On the other hand the equalizing valve should remain open only long enough to secure a practical equalization. For otherwise the liquor in the two receptacles would tend to become of the same strength—which as will be seen would be prejudicial. To prevent such a result the equalizing pipe 109 is made to connect the bottom of the absorber-stills, on the principle that the ammonia in the absorber-still containing the strong liquor will rise to the top. With the alternative structure of Fig. 10 the contact 154 and the line 168 would of course be dispensed with.

As the arm 157 swung into contact with the contact 154 a current also passed from the point 61 through the line 63, the solenoid 53, the point 64 to the point 65 where it united with the current from the point 62. The consequent energization of the solenoid 53 lifted the core 54 from engagement with the central recess of the sector 49. Practically simultaneously with the contact at 154, the arm 157 makes contact with the contact 153. Thereupon a current passes from the point 59 through the line 104, the solenoid 95, the point 105, the line 169 to the contact 153; and thence through the arm 157 back to the return line 39 as before. The consequent energization of the core 96 disengages it from the detent 91. Thereupon the weight 89 falls its full distance to the left and carries with it the pin 84$^a$ until the arm 83 makes connection between the contacts 71$^a$ and 81. The fall of the weight is limited by the left inner side of the triangle 90 engaging with the pin 86. Simultaneously with the depression of the core 96 the cross piece 97 depresses the cross piece 103 into connection with the stops 99$^a$ and 99$^b$. Consequently when connection is established between the contacts 71$^a$ and 81, a current passes from the point 60 through the line 70, the solenoid 66$^a$, the contact 71$^a$, the arm 83, the contact 81, the line 106, the stop 99$^b$, the cross piece 103, the stop 99$^a$, and the line 107 back to the point 40 in the return line 39. The consequent energization of the solenoid 66$^a$ pulls the pin 69 to the left and rotates the lever 48 into the position shown in Fig. 3, the core 54, however, being elevated. Consequently the arm 50ª makes connection between the contacts 43ª and 44ª. As the segment gear 51 is rotated to the left it rotates the half gear wheel 76 until the pin 77 carries the quadrant slot 79 to the extreme right as shown in Fig. 3. The consequent rotation in the opposite direction of the pin 80 pulls the rod 87 and the pin 86 to the left. The pin 86 thereupon pushes to the left the triangle 90 and throws the center of gravity of the weight 89 to the right of the center of the shaft 82. This movement of the weight 89 carries the pin 84ᵇ a little to the right but not sufficiently to break the connection between the contacts 71ª and 81; and the movement is stopped by the core 96 engaging the right side of the detent 91. With a cessation of current through the solenoid 95, which happens when the arm 157 passes above the contact 153, the springs 94ª and 94ᵇ lift the core 96 and the cross piece 97 and thus permit the spring 102 to lift the cross piece 103 from engagement with the stops 99ª and 99ᵇ. But this latter result is deferred for a little while the air is exhausting from the dash pot 98 through the pet cock 100. The length of the engagement between the cross piece 103 and the stops 99ª and 99ᵇ and the consequent duration of the current through the solenoid 66ª can consequently be determined by a proper regulation of the pet cock. With such proper regulation it happens that the arm 157 has passed above the contact 154 and the current through the solenoid 53 has ceased so as to permit the springs 55 to depress the core 54 into engagement with the left detent of the sector 49 before the current through the solenoid 66ª ceases. When the springs 94ª and 94ᵇ lifted the core 96, the weight 89 was in its extreme position to the left so that the top of the core engaged with the triangle 90 to the left of the detent 91. But by reason of the construction of the outside of the triangle, when the rod 87 was pulled to the left, the triangle depressed the core 96 in opposition to the springs 94ª and 94ᵇ until the core came within the detent 91. Consequently very soon after the upper temperature limit of 38° has been reached, the current through the solenoids 53, 66ª and 95 has ceased; but the sector 49 has been locked and all the adjacent parts are in the position shown in Fig. 3.

With the parts of the shifting device D positioned as there shown, the heating current is passing from the point 35 through the line 42, the contact 43ª, the arm 50ª, the contact 44ª, the line 45ª to the heater 4ª; and thence to the return line 39 at 41. Also the valve Y is open for the passage of water through the pipe 29, the channel 73 and the pipes 31ᵇ and 32. The action of the heater 4ª on the strong liquor, which at the beginning of the heating normally fills the absorber-still Aª something more than two-thirds full, is to drive off the ammonia gas under high tension through the pipe 7ª, the check valve 9ª, the outlet header 8, the analyzer Z, and the pipes 11 and 12 to the top of the condenser pipe 15. As the pressure of the gas in the outlet header 8 is greater than that of the gas in the upper part of the absorber-still Aᵇ, the check valve 9ᵇ is kept closed. But as soon as the arm 157 made contact with the contact 153, a current also passed from the point 37 through the line 224 and the electro-magnet 206 to the contact 222; and, the switch 217 being positioned as shown in Fig. 20, through the switch, the contact 223, the lines 227 and 169, and the contact 153 back to the return line 39 at 40 as before. The consequent energization of the electro-magnet rotates clockwise the several arms of the three-part lever 201. Consequently the tooth 215 engages and locks the upper arm 203; the main arm 202 lifts the disks and lock nuts 212 and 210 and the rod 207 and thereby compresses the coiled spring 211; and the lower arm 205 engages and thrusts to the left the limit arm 219 and brings the weight 221 to the left of the vertical axis of the pivot 218. When the weight so gets past the vertical axis of the pivot it falls still farther until the limit arm 220 engages the lower arm 205 and the switch 217 is rotated so far to the right that the switch is opened and the current is broken. This breaking of current does not occur until the tooth 215 has locked the upper arm 203. The elevation of the rod 207 from off the outer lever 198 permits the coiled spring 182 to depress the diaphragm 180 and the bar 187 and to raise the valve 188 from off its seat 197. The valve is thus open and anhydrous liquid ammonia is free to pass from the pipe 18 through the bore 196, the valve seat 197, the slot of the bar 187 and the outlet into the expansion coil K, where it vaporizes, the quantity of the passing ammonia being determined by the adjustment of the disk and lock nut 212. From the expansion coil the vaporized ammonia passes through the inlet header 1, the check valve 2ᵇ and the pipe 3ᵇ into the absorber-still Aᵇ, which, according to the normal operation of the system, is about two-thirds full of weak liquor. The pressure being generated by the heater 4ª, in part passing up the pipe 3ª, keeps closed the check valve 2ª. But a part of the ammonia passing through the valve seat 197, as it vaporizes, rises between the bar 187 and the casings 177 and 179 and impinges against the diaphragm 180; and when its density and tension become sufficiently great it tends to overcome the force of the coiled spring 182, as determined by the position of the collar 183, to lift the diaphragm and bar so as to force the valve 188 to its seat, and thus to check the flow of ammonia. But as the gas in the expansion coil K is being at the same time drawn off by the absorber-still $A^b$, the tension of the gas upon the diaphragm tends to diminish so as to permit the coiled spring to force the valve downward. These two opposing tendencies continue to regulate the position of the valve so long as the upper arm 203 is locked by the tooth 215.

By this regulation of the flow into the expansion coil K from the valve E, in the interval between its absolute opening and closing, not merely prevents too dense vapor and possibly liquid ammonia wastefully passing over into the absorber-stills, but it is also quite essential in maintaining the desired temperature in the refrigerator B. For to there maintain any given temperature, a temperature a few degrees lower must be maintained in the coil; and for every temperature produced by ammonia evaporation, there is a corresponding density and pressure, duly tabulated. Hence the collar 183 is so adjusted through the wrench section of the screw 186 that the spring 182 will close the valve 188 whenever the pressure of the vapor or gas as indicated by the gage L falls below a point corresponding to a temperature the requisite number of degrees below the temperature in the expansion coil, the proper difference between the temperature in the coil and in the refrigerator being a matter of empirical determination according to the temperature to be maintained in the refrigerator. And at the same time that, on contact of the arm 157 with the contact 153, the current passed from the point 37 to the electro-magnet 206, a current divided from the point 225 and passed through the line 269 to the contact 267; and, the switch 257 being positioned as shown in Fig. 24, through the switch, the contact 268, the line 271, the electromagnet 265, the point 228, the lines 227 and 169, and the contact 153 back to the return line 39 at 40 as before. The consequent energization of the electro-magnet rotates the several arms of the three-part lever 252 clockwise in Fig. 1 and contra-clockwise in Fig. 24. Consequently the tooth at the end of the right arm 263 engages and locks the upper arm 255; the main arm 253 is raised from off the projection 239 and as it raises the free disk 250 it compresses the coiled spring 248; and the short arm 254 thrusts downward the limit arm 259 and brings the weight 260 to the right of the vertical axis of the pivot 256. When the weight so gets past the vertical axis of the pivot it falls still farther until the limit arm 258 engages the short arm 254 and the switch 257 is rotated so far to the left in Fig. 24 that the switch is opened and the current is broken. This breaking of current does not occur until the upper arm 255 has been locked. The elevation of the main arm 253 from off the projection 239 permits the lever 237 to be acted upon by other forces. The coiled spring 245 still is operative tending to force the disk and lock nut 246 downward and consequently to keep depressed the stem 244, the diaphragm 243, the lever 237, the stem 235 and the valve 234. But as high pressure gas passes through the pipe 16 into the lower casing 241, as happens when the absorber-still $A^a$ has fairly become operative to generate gas, the high pressure gas tends to force the diaphragm 243 upward. When the tension of the gas gets strong enough it overcomes the thrust of the spring 245 on the disk and lock nut 246 and the weight of the connected parts; and thus it lifts the diaphragm 243, the stem 244, the lever 237, the stem 235 and the valve 234 from off its seat 233. The extent to which the valve can be opened is regulated by the proper adjustment of the disk and lock nut 246 and is proportionate to the pressure of the gas on the under side of the diaphragm. When heat is first applied to the absorber-still, the head pressure as indicated by the gage $H^2$ may not rise immediately to any considerable extent. Consequently there is no need of condensing water until the head pressure reaches say 160 lbs. Therefore the coiled spring 245 and the disk and lock nut 246 may be so regulated that the valve will not open until some such pressure is indicated. And as the pressure increases, it proportionately overcomes the increasing resistance of the coiled spring 245 and thus opens the valve still more according to the changing requirements. Water is now flowing through the pipe 21, the valve W, the pipe 23, the condenser C, the pipe 27, the rectifier R and the waste pipe 28; and also through the pipe 29 into and through the absorber-still $A^b$, as before described, where it removes the heat generated by the absorption of gas coming from the expansion coil. The water passing through the condenser liquefies the gas in the lower end of the pipe 15 and the water overflowing into the rectifier removes a part of the heat of the gas before it reaches the condenser. The valve 33 is used to regulate the proportion of water for the absorber-stills and the valve 22 regulates the total maximum flow. The check valve 25 prevents an emptying of the condenser when the system is standing still.

When the temperature produced by the heater $4^a$ reaches the predetermined limit say of 300° and the arm $132^a$ makes contact with the contact $131^a$, a current passes from the point 61 through the line 63, the solenoid 53, the line 173, the spring contact $133^a$, the arm $132^a$, the contact $131^a$, and the lines 174, 170 and 107 back to the return line 39 at 40. The consequent energization of the solenoid 53 lifts the core 54 from engagement with the central recess of the sector 49. Thereupon the springs 52$^a$ and 52$^b$ bring the lever 48 into a vertical position. The consequent breaking of contact through the arm 50$^a$ between the contacts 43$^a$ and 44$^a$ shuts off the heat from the heater 4$^a$. The temperature in the absorber-still A$^a$ then gradually cools down to that of the surrounding atmosphere. But just as soon as its temperature drops below the limit of 300°, the contact between the arm 132$^a$ and the contact 131$^a$ ceases and the core 54 again engages with the central recess of the sector 49. As the lever 48 assumes this vertical position, the half gear wheel 76 is rotated to the right so as to carry the pin 77 to its lowest position, but without rotating the quadrant slot 79, and so as to push the pin 86 to the right without disturbing the triangle 90.

When the low temperature of 35° is reached in the refrigerator B and the arm 157 makes contact with the contact 156, a current passes from the point 37 through the lines 224 and 229, the electro-magnet 216, the contact 156, the arm 157, the spring contact 158, and the lines 170 and 107 back to the return line 39 at 40. The consequent energization of the electro-magnet 216 lifts the dog 213 and unlocks the upper arm 203. The coiled spring 211 now is free and operative to depress the disks and lock nuts 210 and 212, the main arm 202 and the outer lever 198. The consequent rotation of the several arms of the three-part lever 201 contra-clockwise causes the lower arm 205 to engage and thrust to the right the limit arm 220 and to bring the weight 221 to the right of the vertical axis of the pivot 218. When the weight so gets past the vertical axis of the pivot it falls still farther until the limit arm 219 engages the lower arm 205 and the switch 217 is rotated so far to the left that the switch is closed on the contacts 222 and 223. The depression of the rod 207 upon the outer lever 198 lifts the inner lever 192, the valve 188 to its seat, the bar 187 and the diaphragm 180 and compresses the coiled spring 182. The valve is now closed absolutely, the spring 211 having been assisted to this end by the tension of the vapor or gas in the expansion coil. Also when the arm 157 makes contact with the contact 156, a current divides from the point 225 and passes through the lines 269 and 272 and the electro-magnet 266 to the point 230 where it unites with the current through the electro-magnet 216 back to the return line 39 at 40. The consequent energization of the electro-magnet 266 depresses the left arm 264 and thereby raises and unlocks the tooth of the right arm 263 from the upper arm 255. The coiled spring 248 now becomes operative to depress the disk 250 and to rotate the several arms of the three-part lever 252. Consequently the short arm 254 thrusts upward the limit arm 258 and brings the weight 260 to the left, as seen in Fig. 24, of the vertical axis of the pivot 256. When the weight so gets past the vertical axis of the pivot it falls still farther until the limit arm 259 engages the short arm 254 and the switch 257 is rotated so far to the right as to close on the contacts 267 and 268. In consequence of this last rotation the tooth of the right arm 263 rests on the sloping face of the upper arm 255 and the main arm 253 bears down upon the projection 239. Consequently the lever 237 and the stem 235 are depressed so as to force the valve 234 into its seat 233, closing it absolutely, and the stem 244 and the diaphragm 243 are also depressed notwithstanding the counter force of gas pressure on the under side of the diaphragm. For the coiled springs 248 and 245 are constructed of sufficient strength so that, with the assistance of the weight of their connected moving parts, they will overcome the maximum opposed pressure on the under side of the diaphragm.

The parts are so proportioned and the heat supply is so regulated that the absorber-still A$^a$ continues to generate, without interruption by its thermostat 124$^a$, nearly as long as the absorber-still A$^b$ continues to absorb. When their action ceases, they cool down to atmospheric temperature while the temperature in the refrigerator is rising from 35° toward 38°. Since the valve W is not closed absolutely until the temperature in the refrigerator drops to its low limit, and since the head pressure, as indicated by the valve H, does not drop for some time so as to close the valve 234 by a diminution of pressure on the under side of the diaphragm 243 and so as to shut off the flow of water through the pipe 29 to the absorber-still A$^b$; by proper designing the proportion of parts is made such that the process of generation is completed a little before the process of absorption, thus securing a supply of liquid ammonia at the next opening of the valve E. In the second half of the cycle there is the same operation of the thermostat T, of the equalizing valve 111, and of the valves E and W; but the operation of the shifting device D is slightly different. When the arm 157 now makes contact with the contacts 154 and 153 successively, the core 54 is raised as before, the core 96 is depressed as before so as to depress the cross piece 103 into connection with the stops 99$^a$ and 99$^b$ as before, and the action of the solenoid 95 and of the dash pot 98 is as before. But the weight 89 now falls its full distance to the right so that the arm 83 makes connection between the contacts 71$^b$ and 81. And the current now passes from the point 60 through the line 70, the solenoid 66ᵇ, the contact 71ᵇ, the arm 83, the contact 81 and thence as before to the point 40. The consequent energization of the solenoid 66ᵇ pulls the pin 69 to the right and rotates the lever 48 so that the arm 50ᵇ makes connection between the contacts 43ᵇ and 44ᵇ. As the segment gear 51 is rotated to the right it rotates the half gear wheel 76 until the pin 77 carries the quadrant slot 79 to the extreme left as shown in Figs. 1 and 2. The consequent rotation in the opposite direction of the pin 80 pushes the rod 87 and the pin 86 to the right. The pin 86 thereupon pushes to the right the triangle 90 and throws the center of gravity of the weight 89 to the left of the center of the shaft 82. This movement of the weight 89 carries the pin 84ᵃ a little to the left but not sufficiently to break the connections between the contacts 71ᵇ and 81; and the movement is stopped by the core 96 engaging the left side of the detent 91 as shown in Figs. 1 and 2. With a cessation of current through the solenoid 95, the springs 94ᵃ and 94ᵇ lifted the core 96 into engagement with the triangle 90 to the right of the detent 91; but when the rod 87 was pushed to the right, the triangle depressed the core 96 in opposition to the springs 94ᵃ and 94ᵇ until the core came within the detent 91. And with a cessation of current through the solenoid 53, the core 54 is depressed into engagement with the right detent of the sector 49 before the current through the solenoid 66ᵇ ceases. In this condition the heating current is passing from the point 35 through the line 42, the contact 43ᵇ, the arm 50ᵇ, the contact 44ᵇ, the line 45ᵇ to and through the heater 4ᵇ; and thence through the line 45ᵃ to the return line 39 at 41. Also the valve Y is open for the passage of water from the valve W through the pipe 29, the channel 73 and the pipes 31ᵃ and 32. Obviously the heating of the strong liquor is now going on in the absorber-still Aᵇ so as to expel the gas through the pipe 7ᵇ and the check valve 9ᵇ and thence as before; and the absorber-still Aᵃ is now absorbing gas from the expansion coil through the check valve 2ᵃ and the pipe 3ᵃ.

When the temperature now produced by the heater 4ᵇ reaches the limit of 300° and the arm 132ᵇ makes contact with the contact 131ᵇ, a current passes from the point 61 through the line 63, the solenoid 53, the line 175, the spring contact 133ᵇ, the arm 132ᵇ, the contact 131ᵇ, and the lines 176, 170 and 107 back to the return line 39 at 40. The energized solenoid 53 momentarily lifts the core 54, the springs 52ᵃ and 52ᵇ bring the lever 48 into a vertical position, and the heat is shut off from the heater 4ᵇ by the breaking of the connection between the contacts 43ᵇ and 44ᵇ. Also the half gear wheel 76 is rotated to the left so as to carry the pin 77 to its lowest position, but without rotating the quadrant slot 79, and so as to push the pin 86 to the left without disturbing the triangle 90. All the parts are now in the position shown in Figs. 1 and 2. And when the temperature in the refrigerator again rises nearly to 38, the cycle of operation is complete.

In Fig. 1 two devices are shown for obviating a passage of current through the electro-magnets 206 and 266 except at the precise time the valves E and W are to be absolutely opened: one or the other of these devices is redundant. For in the thermostat T, the contact of the switch arm 157 with the contact 153 is instantaneous. And on the other hand with the usual slow contact thermostat, the current would be shut off from the electro-magnets 206 and 266 practically as quickly by the action of the switches 217 and 257 respectively, as before explained. So that if the thermostat T is retained, the valves E and W may be constructed without these switches and their connected parts. Such a modified construction is shown in Fig. 26, where the differing elements are indicated by primes over the numerals. The two-part lever 201′ is similar to the three-part lever 201 without the lower arm of the latter; and the two-part lever 252′ is similarly like the three-part lever 252.

Other modifications of construction are as follows: A pipe 29′, provided with a drain valve 273′, connects the pipe 21′′ between the valves 22 and W′ with the three-way valve Y. In the pipe 29′ is placed a valve chamber 274′, containing a valve preferably of the gate valve type similar to the valve 111. The chamber may be bolted to a casing, which itself can be bolted to any convenient surface. Above the chamber 274′ is a perforated bracket 275′ through which a valve stem 276′ passes, ending in a tooth 277′ at its upper end for engagement on its under side, passing through a suitable stuffing box in the top of the chamber 274′ and secured at its lower end to the valve. A part of the same structure consists of a vertical solenoid 278′ and a horizontal electro-magnet 279′. The core of the solenoid is provided with a horizontal arm 280′, perforated at its outer end for the passage therethrough of the stem 276′, to which the arm is adjustably secured by a set screw. A spring 281′ enspirals the stem 276′ and abuts at its top against the under side of the bracket 275′ and at its bottom against the upper side of the arm 280′. Pivoted at its lower end on a suitable pin is a detent 282′, having an armature at its right side adapted to be acted upon by the electro-magnet 279′. The detent is so constructed and positioned that it normally rests against the right side of the bracket 275′ and engages and locks in a lifted position the tooth 277' whenever the tooth is above the top of the detent; but when the electro-magnet 279' is energized, the detent is momentarily drawn to the right and releases the tooth. From the point 225 the line 269 passes through points 270 and 230' to a point 283'. From the point 270 a line 271' passes directly to the electro-magnet 265 and thence to the point 228. From the point 230' a line 272' passes through the electro-magnet 266 to a point 64' having the same other line connections as the point 64 in Fig. 1. From the point 283' a line 284' passes through the solenoid 278' to a point 285' in the line 227. From the point 283' a line 286' passes through the electro-magnet 279' to a point 287' in the line 229. In this alternative construction the difference of operation is as follows: On the temperature in the refrigerator rising say to 38° and the arm 157 making contact with the contact 153, the current from the point 37 passes through the electro-magnets 206 and 265 so as to open the valves E' and W'; but the current is immediately shut off from the electro-magnets as soon as the arm 157 rises above the plate 152. Simultaneously with such opening of the valves E' and W' a current passes from the point 283' through the line 284' to the solenoid 278' and thence to the point 285', whence it unites with the current from the electro-magnets 206 and 265 in passing to the return line 39 at the point 40. The consequent lifting of the stem 281' turns on a flow of water through the pipe 29' to whichever absorber-still is then acting as an absorber. Then when the temperature rises say to 300° in that particular absorber-still, a current passes from the point 230' through the line 272' to the electro-magnet 266 and thence to the point 64', where it unites with the current from the point 61 through the electro-magnet 53 and the thermostat 124ª or 124ᵇ, as the case may be, and returns to the line 39 at the point 40 as before. Consequently on the completion of the process of generation in either absorber-still, the valve W' is closed absolutely and the flow of water to the condenser C and the rectifier R is stopped. This leaves the condenser and rectifier to cool down to atmospheric temperature without any more water. The parts are so constructed and proportioned and the supply of heat is so regulated that the process of generation is completed a considerable time before the valve E' closes. Accordingly the final stage to be noted in either half of the modified cycle is the absolute closing of the expansion valve and the simultaneous shutting off of the flow of water to whichever absorber-still is in action as an absorber. For on the temperature in the refrigerator falling say to 35° and the arm 157 making contact with the contact 156, a current passes from the point 37 through the line 224, the electro-magnet 216 and the line 229 back to the return line 39 at 40 as before described and also from the point 225 through the line 269 and 286' to the point 279' to the point 287'. The consequent energization of the electro-magnet 279' momentarily pulls the detent 282' to the right. Thereupon the spring 281' depresses the stem 176' and shuts off the flow of water through the pipe 29' at the same time that the expansion valve E' is closed absolutely.

To charge the system the commercial "26° aqua ammonia" may be employed; but a stronger solution, say of 28° or 30° according to the Baumé scale, is even better. To fill the absorber-stills the valves 5 and 13 may be closed, the valve E or E' may be locked open by hand, and the included air may be pumped out by a hand vacuum pump through the valve 20. Then the solution is introduced through the valve 6 so as to fill the absorber-stills about three-quarters full. Any suitable conductor may be used to make a brief connection between the contacts 43ª and 44ª and also the contacts 43ᵇ and 44ᵇ. A little heat is sufficient to expel enough gas to drive all the air to the top whence it may be blown off by a brief opening of the purge valve 14. This valve is then closed, the valve E or E' is unlocked, and the valves 5 and 13 are opened. If preferred the solution may be introduced in the first instance without pumping out the air. Then after the gas circuit has been filled with ammonia, if the system is allowed to stand still for a while, the air will collect at the highest point and may be blown off through the purge valve 14. Before operating the system automatically, the absorber-still which is first to act as an absorber should have its ammonia driven off until its thermostat makes a closing contact. Where the weight 89 is inclined to the left, as in Figs. 1, 2 and 26, such an absorber-still is Aᵇ. For this preliminary heating, any suitable conductor is used to make the temporary connection between the contacts 43ᵇ and 44ᵇ. At the same time the valve W or W' is locked open by hand, the valve 22 is opened, and the valve 30 is closed. If the solution becomes at any time too weak from the accidental escape of gas, on locking the valve E or E' open by hand and closing the valve 19, anhydrous ammonia may be introduced through the valve 20.

I claim:

1. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, means for regulating the flow of refrigerant from said reservoir through said chamber, and means operating to intermittently heat the contents of said stills in alternation to a predetermined limit.

2. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, means for regulating the flow of refrigerant from said reservoir through said chamber, and means operating to intermittently heat the contents of said stills in alternation until such contents reach a predetermined high temperature.

3. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, means for regulating the flow of refrigerant from said reservoir through said chamber, means operating to intermittently heat the contents of said stills in alternation, and electric devices controlled by the high temperatures of said stills and operating to end each such heating at a predetermined limit.

4. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, means for regulating the flow of refrigerant from said reservoir through said chamber, means adapted for intermittently heating the contents of said stills in alternation to a predetermined limit, and means operating to cause the heating of each still to begin after but to be otherwise independent of the termination of the heating of any other still.

5. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, means for regulating the flow of refrigerant from said reservoir through said chamber, means operating to intermittently heat the contents of said stills in alternation to a predetermined limit, and means operating to cool each still after each heating thereof.

6. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoirs into said stills, means for regulating the flow of refrigerant from said reservoir through said chamber, means adapted for intermittently heating the contents of said stills in alternation to a predetermined limit, means operating to cause the heating of each still to begin after but to be otherwise independent of the termination of the heating of any other still, and means operating to cool each still after each heating thereof.

7. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, valve means controlling the flow of refrigerant from said reservoir through said chamber, means adapted for heating the contents of said stills in alternation to a predetermined limit, and a thermostat operating at a high temperature limit through said valve means to permit such flow and through said heating means to start a heating of one of said stills and at a low temperature limit through said valve means to prevent such flow.

8. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, valve means controlling the flow of refrigerant from said reservoir through said chamber, means adapted for heating the contents of said stills in alternation to a predetermined limit, means operating to cool the contents of each still when acting as an absorber, and a thermostat operating at a high temperature limit through said valve means to permit such flow and through said heating means to start a heating of one of said stills and at a low temperature limit through said valve means to prevent such flow.

9. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, means for regulating the flow of refrigerant from said reservoir through said chamber, means operating to intermittently heat the contents of said stills in alternation to a predetermined limit, and means opening communication between said stills for a brief time before each such heating.

10. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said reservoir into said stills, means for regulating the flow of refrigerant from said reservoir through said chamber, means adapted for intermittently heating the contents of said stills in alternation to a predetermined limit, means operating to cause the heating of each still to begin after but to be otherwise independent of the termination of the heating of any other still, and means opening communication between said stills for a brief time before each such heating.

11. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, means for regulating the flow of refrigerant from said reservoir through said chamber, means operating to intermittently heat the contents of said stills in alternation to a predetermined limit, means opening communication between said stills for a brief time before each such heating, and means operating to cool each still after each heating thereof.

12. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said reservoir into said stills, means adapted for intermittently heating the contents of said stills in alternation to a predetermined limit, means operating to cause the heating of each still to begin after but to be otherwise independent of the termination of the heating of any other still, means opening communication between said stills for a brief time before each such heating, and means operating to cool each still after each heating thereof.

13. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, valve means controlling the flow of refrigerant from said reservoir through said chamber, means adapted for heating the contents of said stills in alternation to a predetermined limit, a thermostat operating at a high temperature limit through said valve means to permit such flow and through said heating means to start a heating of one of said stills and at a low temperature limit through said valve means to prevent such flow, and means operating to cool each still after each heating thereof.

14. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, valve means controlling the flow of refrigerant from said reservoir through said chamber, means adapted for heating the contents of said stills in alternation to a predetermined limit, means operating to cool the contents of said stills in alternation to a predetermined limit, means operating to cool the contents of each still when acting as an absorber, a thermostat operating to a high temperature limit through said valve means to permit such flow and through said heating means to start a heating of one of said stills and at a low temperature limit through said valve means to prevent such flow, and means operating to cool each still after each heating thereof.

15. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, a valve controlling the flow of refrigerant from said reservoir through said chamber, a heater for each still, a thermostat operatively connected to said valve and to said heaters and operating at a high temperature limit through said valve to permit such flow and to start the action of one of said heaters and at a low temperature limit through said valve to prevent such flow, means operating to end each such heating at a predetermined limit, and means operating after each such heating to shift the operativeness of said thermostat to another heater.

16. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, a feed valve controlling the flow of refrigerant from said reservoir through said chamber, a heater for each still, a cooling pipe for each still, a water valve controlling each of said pipes, a thermostat operatively connected to said valves and to said heaters and at a high temperature limit operating through said feed valve to permit such flow of refrigerant, operating through said water valve to permit a flow of water through the pipe of one of said stills and operating to start the action of the heater of another of said stills and at a low temperature limit operating to close both said valves, means operating to end each such heating at a predetermined limit, and means operating after each such heating to shift the operativeness of said thermostat to another heater and to shift the control of said water valve to another cooling pipe.

17. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, a valve controlling the flow of refrigerant from said reservoir through said chamber, a heater for each still, a thermostat operatively connected to said valve and to said heaters and operating at a high temperature limit through said valve to permit such flow and to start the action of one of said heaters and at a low temperature limit through said valve to prevent such flow, means opening communication between said stills for a brief time before each such heating, means operating to end each such heating at a predetermined limit, and means operated after each such heating to shift the operativeness of said thermostat to another heater.

18. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, a feed valve controlling the flow of refrigerant from said reservoir through said chamber, a heater for each still, an equalizing pipe connecting said stills, an equalizing valve controlling said pipe and normally closed, a thermostat operatively connected to said valves and to said heaters and at a high temperature limit operating to open said equalizing valve for a brief time, operating through said feed valve to permit such flow and operating to start the action of one of said heaters and at a low temperature limit operating through said feed valve to prevent such flow, means operating to end each such heating at a predetermined limit, and means operating after each such heating to shift the operativeness of said thermostat to another heater.

19. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, a feed valve controlling the flow of refrigerant from said reservoir through said chamber, a heater for each still, a cooling pipe for each still, a water valve controlling each of said pipes, a thermostat operatively connected to said valves and to said heaters and at a high temperature limit operating through said feed valve to permit such flow of refrigerant, operating through said water valve to permit a flow of water through the pipe of one of said stills and operating to start the action of the heater of another of said stills and at a low temperature limit operating to close both said valves, means opening communication between said stills for a brief time before each such heating, means operating to end each such heating at a predetermined limit, and means operating after each such heating to shift the operativeness of said thermostat to another heater and to shift the control of said water valve to another cooling pipe.

20. In combination a refrigerant reservoir, a plurality of stills in parallel with one another and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, a feed valve controlling the flow of refrigerant from said reservoir through said chamber, a heater for each still, a cooling pipe for each still, a water valve controlling each of said pipes, an equalizing pipe connecting said stills, an equalizing valve controlling said latter pipe and normally closed, a thermostat operatively connected to said valves and to said heaters and at a high temperature limit operating to open said equalizing valve for a brief time, operating through said feed valve to permit such flow of refrigerant, operating through said water valve to permit a flow of water through the pipe of one of said stills and operating to start the action of the heater of another of said stills and at a low temperature limit operating to close both said feed and water valves, means operating to end each such heating at a predetermined limit, and means operating after each such heating to shift the operativeness of said thermostat to another heater and to shift the control of said water valve to another cooling pipe.

21. In combination a refrigerant reservoir, vessels adapted to contain an absorbent, an expansion chamber leading from said reservoir to said vessels, a transmitting conduit leading from said vessels to said reservoir, means preventing a back flow of refrigerant from said vessels into said chamber, means preventing a back flow of refrigerant from said reservoir into said vessels, means for regulating the flow of refrigerant from said reservoir through said chamber, means for intermittently heating the contents of said vessels, a water conduit having passages in proximity to the passages of said reservoir into which said transmitting conduit leads, and means operating to permit a flow through said water conduit when the contents of said vessels are being heated and to terminate each such flow when each such heating ceases.

22. In combination a refrigerant reservoir, vessels adapted to contain an absorbent, an expansion chamber leading from said reservoir to said vessels, a transmitting conduit leading from said vessels to said reservoir, means preventing a back flow of refrigerant from said vessels into said chamber, means preventing a back flow of refrigerant from said reservoir into said vessels, means for regulating the flow of refrigerant from said reservoir through said chamber, means for intermittently heating the contents of said vessels, a water conduit having passages in proximity to the passages of said reservoir into which said transmitting conduit leads, a valve controlling said water conduit, means unlocking said valve when each such heating begins, means operating when said valve is unlocked and when the pressure of the refrigerant expelled by such heating reaches a predetermined limit to open said valve, and means closing and locking said valve when each such heating ceases.

23. In combination a refrigerant reservoir, two stills in parallel with each other and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, means for regulating the flow of refrigerant from said reservoir through said chamber, means for intermittently heating the contents of said stills in alternation, and means periodically approximately equalizing the height of the contents of said stills.

24. In combination a refrigerant reservoir, two stills in parallel with each other and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoirs into said stills, valve means controlling the flow of refrigerant from said reservoir through said chamber, means for intermittently heating the contents of said stills in alternation, equalizing means adapted to approximately equalize the height of the contents of said stills, and a thermostat at a high temperature limit operating on said valve means so as to permit such flow, at a low temperature limit operating on said valve means so as to prevent such flow and periodically operating on said equalizing means so as to cause such approximate equalization.

25. In combination a refrigerant reservoir, two stills in parallel with each other and each adapted to contain an absorbent, an expansion chamber leading from said reservoir to said stills, a conduit leading from said stills to said reservoir, means preventing a back flow of refrigerant from said stills into said chamber, means preventing a back flow of refrigerant from said reservoir into said stills, valve means controlling the flow of refrigerant from said reservoir through said chamber, means for intermittently heating the contents of said stills in alternation, equalizing means adapted to approximately equalize the height of the contents of said stills, and a thermostat at a high temperature limit operating on said valve means so as to permit such flow, and at a low temperature limit operating on said valve means so as to prevent such flow and operating on said equalizing means so as to cause such approximate equalization before each such heating.

26. In combination an expansion coil, an apparatus operative to draw in gas and to make the same more dense, a condenser leading from said apparatus to said coil, an expansion valve for transmitting condensed fluid into said coil, a pipe for supplying cooling fluid to said condenser, a condenser valve controlling said pipe, means whereby the pressure of gas in said condenser tends to open said condenser valve, and means automatically operative to permit such pressure to act according to its tendency after the opening of said expansion valve and operative to close said condenser valve when said expansion valve is closed.

27. In combination an expansion coil, an apparatus operative to draw in gas and to make the same more dense, a condenser leading from said apparatus to said coil, an expansion valve for transmitting condensed fluid into said coil, a pipe for supplying cooling fluid to said condenser, a condenser valve controlling said pipe, means whereby the pressure of gas in said condenser tends to open said condenser valve, a locking device for said condenser valve, and means automatically operative to unlock said device, so as to permit such pressure to act according to its tendency after the opening of said expansion valve and operative to lock said device so as to close said condenser valve when said expansion valve is closed.

28. In combination an expansion chamber, an apparatus operative to draw in gas from said chamber and to make the same more dense, a refrigerant reservoir leading from said apparatus to said chamber, valve means controlling the flow of refrigerant from said reservoir through said chamber, a water conduit having passages in proximity to the passages of said reservoir leading from said apparatus, valve means controlling said water conduit, and a thermostat at a high temperature limit operating on both said valve means so as to permit such flow of refrigerant and also such flow through said water conduit and at a low temperature limit operating on both said valve means so as to prevent each such flow.

29. In combination an expansion chamber, an apparatus operative to draw in gas from said chamber and to make the same more dense, a refrigerant reservoir leading from said apparatus to said chamber, valve means controlling the flow of refrigerant from said reservoir through said chamber, a water conduit having passages in proximity to the passages of said reservoir leading from said apparatus, a valve controlling said water conduit, a device for locking or unlocking said valve, a thermostat at a high temperature limit operating on said valve means so as to permit such flow of refrigerant and on said device so as to unlock said valve and at a low temperature limit operating on said valve means so as to prevent such flow and on said device so as to lock said valve in a closed condition, and means operating when said valve is unlocked and when the pressure of the condensed refrigerant reaches a predetermined limit to open said valve.

30. In combination an expansion coil in a place to be refrigerated, a thermostat controlled by the temperature in said place, an apparatus operative to draw in gas and to make the same more dense, a condenser leading from said apparatus to said coil, an expansion valve controlled by said thermostat for transmitting condensed fluid into said coil, a pipe for supplying cooling fluid to said condenser, a condenser valve controlling said pipe, means whereby the pressure of gas in said condenser tends to open said condenser valve, and means automatically operative to permit such pressure to act according to its tendency upon the opening of said expansion valve and operative to close said condenser valve when said expansion valve is closed.

31. In combination an expansion coil in a place to be refrigerated, a thermostat controlled by the temperature in said place, an apparatus operative to draw in gas and to make the same more dense, a condenser leading from said apparatus to said coil, an expansion valve controlled by said thermostat for transmitting condensed fluid into said coil, a pipe for supplying cooling fluid to said condenser, a condenser valve controlling said pipe, means whereby the pressure of gas in said condenser tends to open said condenser valve, a locking device for said condenser valve, and means automatically operative to unlock said device so as to permit such pressure to act according to its tendency and operative to lock said device so as to close said condenser valve when said expansion valve is closed.

32. In combination an apparatus operative to draw in gas and to make the same more dense, a condenser leading from said apparatus, an expansion chamber leading from said condenser, a pipe for supplying cooling fluid to said condenser, a condenser valve controlling said pipe, means operating to open said expansion valve and to permit the opening of said condenser valve, means thereafter opening said condenser valve when the pressure of the condensed gas reaches a predetermined limit, and means thereafter closing both said valves.

33. In combination an expansion chamber, an apparatus operative to draw in gas from said chamber and to make the same more dense, a refrigerant reservoir leading from said apparatus to said chamber, an expansion-valve controlling the flow of refrigerant from said reservoir through said chamber, a water conduit having passages in proximity to the passage of said reservoir leading from said apparatus, a water valve controlling said conduit, means operating to open said expansion valve and to permit the opening of said water valve, means thereafter opening said water valve when the pressure of the condensed refrigerant reaches a predetermined limit, and means thereafter closing both said valves.

34. In combination a thermostat controlled by the temperature in a place to be refrigerated, an apparatus operative to draw in gas and to make the same more dense, a condenser leading from said apparatus, an expansion valve leading from said condenser and controlled by said thermostat, said thermostat causing said valve to open at one predetermined limit of such temperature and to close at a lower predetermined limit of such temperature, a pipe for supplying cooling fluid to said condenser, a condenser valve controlling said pipe, means automatically operated by the pressure of the condensed gas for opening said condenser valve, and means automatically operated by said thermostat to close said condenser and expansion valves.

35. In combination a thermostat controlled by the temperature in a place to be refrigerated, an apparatus operative to draw in gas and to make the same more dense, a condenser leading from said apparatus, an expansion valve leading from said condenser to said coil and controlled by said thermostat, said thermostat causing said valve to open at one predetermined limit of such temperature and to close at a lower predetermined limit of such temperature, means automatically operative for preventing gas pressure in said coil from exceeding a predetermined limit in the interval between such opening and closing, a pipe for supplying cooling fluid to said condenser, a condenser valve controlling said pipe, means automatically operated by the pressure of the condensed gas at a predetermined pressure limit to open said condenser valve, and means automatically operated by said thermostat to close said condenser valve simultaneously with such closing of said expansion valve.

36. In combination a thermostat controlled by the temperature in a place to be refrigerated, an apparatus operative to draw in gas and to make the same more dense, a condenser leading from said apparatus, an expansion valve leading from said condenser to said coil and controlled by said thermostat, said thermostat causing said valve to open at one predetermined limit of such temperature and to close at a lower predetermined limit of such temperature, means intermediately actuated by gas pressure at said valve to check the flow through said coil as such pressure reaches a predetermined limit, a pipe for supplying cooling fluid to said condenser, a condenser valve controlling said pipe, means automatically operated by the pressure of the condensed gas at a predetermined pressure limit to open such condenser valve, and means automatically operated by said thermostat to close said condenser valve simultaneously with such closing of expansion valve.

37. In combination an expansion coil, a plurality of receptacles each adapted to be used successively as an absorber and as a still, means automatically operative to employ each of them in succession as an absorber to absorb gas from said coil and to expel from another of them as a still gas previously so absorbed, the termination of each such absorption process occurring before but being otherwise independent of the starting of the absorption process in such other receptacle, means for condensing the expelled gas, and an expansion valve for transmitting the condensed fluid into said coil.

38. In combination an expansion chamber, a plurality of receptacles each adapted to be used successively as an absorber and as a still, means operating to employ each of them in succession as an absorber to absorb refrigerant from said chamber and to expel from another of them as a still refrigerant previously so absorbed, means causing the termination of each such absorption process to occur before but to be otherwise independent of the starting of the absorption process in such other receptacle, means for condensing the expelled refrigerant, and means for transmitting the condensed refrigerant into said chamber.

39. In combination an expansion chamber, a plurality of receptacles each adapted to be used successively as an absorber and as a still, means operating to employ each of them in succession as an absorber to absorb refrigerant from said chamber and to expel from another of them as a still refrigerant previously so absorbed, means causing the termination of each such absorption process to occur before but to be otherwise independent of the starting of the absorption process in such other receptacle, means for condensing the expelled refrigerant, means for transmitting the condensed refrigerant into said chamber, and means operating to cool each receptacle while acting as an absorber.

40. In combination an expansion chamber, a plurality of receptacles each adapted to be used successively as an absorber and as a still, a thermostat in proximity to said chamber, means controlled by said thermostat and operating to employ each of said receptacles in succession as an absorber to absorb refrigerant from said chamber and to expel from another of them as a still refrigerant previously so absorbed, said thermostat acting at a high temperature limit to start each such absorption and expulsion process and at a low temperature limit to terminate the absorption process, means terminating each such expulsion process at a high temperature limit, means for condensing the expelled refrigerant, and means for transmitting the condensed refrigerant into said chamber.

41. In combination an expansion chamber, a plurality of receptacles each adapted to be used successively as an absorber and as a still, a thermostat in proximity to said chamber, means controlled by said thermostat and operating to employ each of said receptacles in succession as an absorber to absorb refrigerant from said chamber and to expel from another of them as a still refrigerant previously so absorbed, said thermostat acting at a high temperature limit to start each such absorption and expulsion process and at a low temperature limit to terminate the absorption process, means terminating each such expulsion process at a high temperature limit, means for condensing the expelled refrigerant, means for transmitting the condensed refrigerant into said chamber and means operating to cool each receptacle while acting as an absorber.

42. In combination an expansion chamber, a refrigerant reservoir leading to said chamber, a plurality of receptacles each leading from said chamber into said reservoir and each adapted to be used necessarily as an absorber and as a still, a valve controlling the passage from said reservoir into said chamber, a thermostat in proximity to said chamber, means controlled by said thermostat and operating to employ each of said receptacles in succession as an absorber to absorb refrigerant from said chamber and to expel from another of them as a still into said reservoir refrigerant previously so absorbed, said thermostat acting at a high temperature limit to open said valve and to start each such absorption and expulsion process and at a low temperature limit to close said valve and to terminate the absorption process, means terminating each such expulsion process at a high temperature limit and means for condensing the expelled refrigerant.

43. In combination an expansion chamber, a refrigerant reservoir leading to said chamber, a plurality of receptacles each leading from said chamber into said reservoir and each adapted to be used successively as an absorber and as a still, a valve controlling the passage from said reservoir into said chamber, a thermostat in proximity to said chamber, means controlled by said thermostat and operating to employ each of said receptacles in succession as an absorber to absorb refrigerant from said chamber and to expel from another of them as a still into said reservoir refrigerant previously so absorbed, said thermostat acting at a high temperature limit to open said valve and to start each such absorption and expulsion process and at a low temperature limit to close said valve and to terminate the absorption process, means terminating each such expulsion process at a high temperature limit, means for condensing the expelled refrigerant, and means operating to cool each receptacle while acting as an absorber.

44. In combination an expansion coil passing through a place to be refrigerated, two absorber-stills each leading from said coil and in parallel with each other and each adapted in alternation to absorb gas from said coil while the other as a still is expelling gas previously so absorbed, a condenser leading from said absorber-stills into said coil, an expansion valve controlling the passage between said condenser and said coil, a thermostat controlled by the temperature in said place and operative at its high temperature limit to cause said expansion valve to open and at its low temperature limit to cause said expansion valve to close, means automatically operative to apply heat so as to cause one absorber-still to act as a still at a time while the other is acting as an absorber, and means controlled by said thermostat and operative to periodically alternate the functions of said absorber-stills.

45. In combination an expansion coil passing through a place to be refrigerated, two absorber-stills each leading from said coil and in parallel with each other and each adapted in alternation to absorb gas from said coil while the other as a still is expelling gas previously so absorbed, a condenser leading from said absorber-stills into said coil, an expansion valve controlling the passage between said condenser and said coil, and a thermostat controlled by the temperature in said place and operative at its high temperature limit to cause said expansion valve to open and one of said absorber-stills to act as a still and at its low temperature limit to cause said expansion valve to close and to terminate the function of such absorber-still to act as a still until after the other has so acted.

46. In combination an expansion coil, two absorber-stills each adapted in alternation to absorb gas from said coil while the other is adapted as a still to expel gas previously so absorbed, means for condensing the expelled gas, an electrically actuated expansion valve and thereby opened and closed for transmitting the condensed fluid into said coil, electrically actuated means for applying heat to cause one absorber-still to act as a still at a time when the other is acting as an absorber, and electrically actuated means for alternating the function of said absorber-stills after each such closing of said expansion valve.

47. In combination an expansion coil in a place to be refrigerated, a thermostat controlled by the temperature in said place, two absorber-stills each adapted in alternation to absorb gas from said coil while the other is adapted as a still to expel gas previously so absorbed, means for condensing the expelled gas, an expansion valve controlled by said thermostat and thereby opened and closed for transmitting the condensed fluid into said coil, automatic means controlled by said thermostat for applying heat to cause one absorber-still to act as a still at a time when the other is acting as an absorber, and automatic means for alternating the function of said absorber-stills after each such closing of said expansion valve.

48. In combination an expansion coil in a place to be refrigerated, a thermostat controlled by the temperature in said place, two absorber-stills each adapted in alternation to absorb gas from said coil while the other is adapted as a still to expel gas previously so absorbed, means for condensing the expelled gas, an expansion valve for transmitting the condensed fluid into said coil, automatic means controlled by said thermostat for opening said expansion valve at one predetermined limit of such temperature and for subsequently closing it at a lower predetermined limit of such temperature, automatic means for preventing the pressure of gas in said coil from exceeding a predetermined limit between such opening and closing, automatic means controlled by said thermostat for applying heat to cause one absorber-still to act as a still at a time when the other is acting as an absorber, and automatic means for alternating the function of said absorber-stills after each such closing of said expansion valve.

49. In combination an expansion coil in a place to be refrigerated, a thermostat controlled by the temperature in said place, two absorber-stills each adapted in alternation to absorb gas from said coil while the other is adapted as a still to expel gas previously so absorbed, means for condensing the expelled gas, an expansion valve for transmitting the condensed fluid into said coil, automatic means controlled by said thermostat for opening said expansion valve at one predetermined limit of such temperature and for subsequently closing it at a lower predetermined limit of such temperature, means intermediately actuated by the pressure of gas at said valve to check the flow through said coil as such pressure reaches a predetermined limit, automatic means controlled by said thermostat for applying heat to cause one absorber-still to act as a still at a time when the other is acting as an absorber, and automatic means for alternating the function of said absorber-stills after each such closing of said expansion valve.

50. In combination an expansion coil, two absorber-stills each adapted in alternation to absorb gas from said coil while the other is adapted as a still to expel gas previously so absorbed, means for condensing the expelled gas, an expansion valve that can be opened and closed for transmitting the condensed fluid into said coil, automatic means for causing one absorber-still to act as an absorber while gas is passing through said valve, automatic means for applying heat to the other absorber-still from the opening of said expansion valve until a predetermined limit is reached, and automatic means for alternating the function of said absorber-stills after each such closing of said expansion valve.

51. In combination an expansion coil, two absorber-stills each adapted in alternation to absorb gas from said coil while the other is adapted as a still to expel gas previously so absorbed, means for condensing the expelled gas, an expansion valve for transmitting the condensed fluid into said coil, automatic means for opening said expansion valve and for subsequently closing it, automatic means for preventing the pressure of gas in said coil from exceeding a predetermined limit between such opening and closing, automatic means for causing one absorber-still to act as an absorber while gas is passing through said valve, automatic means for applying heat to the other absorber-still from the opening of said expansion valve until a predetermined limit is reached, and automatic means for alternating the function of said absorber-stills after each such closing of said expansion valve.

52. In combination an expansion coil, two absorber-stills each adapted in alternation to absorb gas from said coil while the other is adapted as a still to expel gas previously so absorbed, means for condensing the expelled gas, an expansion valve for transmitting the condensed fluid into said coil, automatic means for opening said expansion valve and for subsequently closing it, means intermediately actuated by the pressure of gas at said valve to check the flow through said coil as such pressure reaches a predetermined limit, automatic means for causing one absorber-still to act as an absorber while gas is passing through said valve, automatic means for applying heat to the other absorber-still from the opening of said expansion valve until a predetermined limit is reached, and automatic means for alternating the function of said absorber-stills after each such closing of said expansion valve.

53. In combination an expansion coil, two absorber-stills each adapted in alternation to absorb gas from said coil while the other is adapted as a still to expel gas previously so absorbed, means for condensing the expelled gas, an expansion valve for transmitting the condensed fluid into said coil, electrically controlled means for releasing said expansion valve and for subsequently closing it, automatic means for preventing the pressure of gas in said coil from exceeding a predetermined limit between such opening and closing, automatic means for causing one absorber-still to act as an absorber while gas is passing through said valve, electrically actuated means for applying heat to the other absorber-still from the opening of said expansion valve until a predetermined limit is reached, and electrically actuated means for alternating the function of said absorber-stills after each such closing of said expansion valve.

54. In combination an expansion coil, two absorber-stills each adapted in alternation to absorb gas from said coil while the other is adapted as a still to expel gas previously so absorbed, means for condensing the expelled gas, an expansion valve for transmitting the condensed fluid into said coil, electrically controlled means for releasing said expansion valve and for subsequently closing it, means intermediately actuated by the pressure of gas at said valve to check the flow through said coil as such pressure reaches a predetermined limit, automatic means for causing one absorber-still to act as an absorber while gas is passing through said valve, electrically actuated means for applying heat to the other absorber-still from the opening of said expansion valve until a predetermined limit is reached, and electrically actuated means for alternating the function of said absorber-stills after each such closing of said expansion valve.

55. In combination an expansion coil in a place to be refrigerated, a thermostat controlled by the temperature in said place, two absorber-stills each adapted in alternation to absorb gas from said coil while the other is adapted as a still to expel gas previously so absorbed, means for condensing the expelled gas, an expansion valve for transmitting the condensed fluid into said coil, automatic means controlled by said thermostat for opening said expansion valve at one predetermined limit of such temperature and for subsequently closing it at a lower predetermined limit of such temperature, automatic means for preventing the pressure of gas in said coil from exceeding a predetermined limit between such opening and closing, automatic means for causing one absorber-still to act as an absorber while gas is passing through said valve, automatic means controlled by said thermostat for applying heat to the other absorber-still from the opening of said expansion valve until a predetermined limit is reached, and automatic means for alternating the function of said absorber-stills after each such closing of said expansion valve.

56. In combination an expansion coil in a place to be refrigerated, a thermostat controlled by the temperature in said place, two absorber-stills each adapted in alternation to absorb gas from said coil while the other is adapted as a still to expel gas previously so absorbed, means for condensing the expelled gas, an expansion valve for transmitting the condensed fluid into said coil, automatic means controlled by said thermostat for opening said expansion valve at one predetermined limit of such temperature and for subsequently closing it at a lower predetermined limit of such temperature, means intermediately actuated by the pressure of gas at said valve to check the flow through said coil as such pressure reaches a predetermined limit, automatic means for causing one absorber-still to act as an absorber while gas is passing through said valve, automatic means controlled by said thermostat for applying heat to the other absorber-still from the opening of said expansion valve until a predetermined limit is reached, and automatic means for alternating the function of said absorber-stills after each such closing of said expansion valve.

57. In combination an expansion coil in a place to be refrigerated, a thermostat controlled by the temperature in said place, two absorber-stills each adapted in alternation to absorb gas from said coil while the other is adapted as a still to expel gas previously so absorbed, means for condensing the expelled gas, an electrically controlled expansion valve controlled by said thermostat and thereby opened and closed for transmitting the condensed fluid into said coil, automatic means for causing one absorber-still to act as an absorber while gas is passing through said valve, electrically actuated means controlled by said thermostat for applying heat to the other absorber-still from the opening of said expansion valve until a predetermined limit is reached, and electrically actuated means for alternating the function of said absorber-stills after each such closing of said expansion valve.

58. In combination an expansion coil in a place to be refrigerated, a thermostat controlled by the temperature in said place, two absorber-stills each adapted in alternation to absorb gas from said coil while the other is adapted as a still to expel gas previously so absorbed, means for condensing the expelled gas, an expansion valve for transmitting the condensed fluid into said coil, electrically controlled means controlled by said thermostat for opening said expansion valve at one predetermined limit of such temperature and for subsequently closing it at a lower predetermined limit of such temperature, automatic means for preventing the pressure of gas in said coil from exceeding a predetermined limit between such opening and closing, automatic means for causing one absorber-still to act as an absorber while gas is passing through said valve, electrically actuated means controlled by said thermostat for applying heat to the other absorber-still from the opening of said expansion valve until a predetermined limit is reached, and electrically actuated means for alternating the function of said absorber-stills after each such closing of said expansion valve.

59. In combination an expansion coil in a place to be refrigerated, a thermostat controlled by the temperature in said place, two absorber-stills each adapted in alternation to absorb gas from said coil while the other is adapted as a still to expel gas previously so absorbed, means for condensing the expelled gas, an expansion valve for transmitting the condensed fluid into said coil, electrically controlled means controlled by said thermostat for opening said expansion valve at one predetermined limit of such temperature and for subsequently closing it at a lower predetermined limit of such temperature, means intermediately actuated by the pressure of gas at said valve to check the flow through said coil as such pressure reaches a predetermined limit, automatic means for causing one absorber-still to act as an absorber while gas is passing through said valve, electrically actuated means controlled by said thermostat for applying heat to the other absorber-still from the opening of said expansion valve until a predetermined limit is reached, and electrically actuated means for alternating the function of said absorber-stills after each such closing of said expansion valve.

60. In combination an expansion coil, two chambers each adapted in alternation to absorb gas from said coil while the other is adapted to expel gas previously so absorbed, means for condensing the expelled gas, an expansion valve that can be opened and closed for transmitting the condensed fluid into said coil, automatic means for causing one chamber to act as an absorber while gas is passing through said valve, automatic means for applying heat to the other chamber during a time between an opening of said valve and the next action of the chamber as an absorber and until most of the gas previously absorbed into it has been expelled, and automatic means for alternating the function of said chambers after each such closing of said valve.

61. In combination an expansion coil, two chambers each adapted in alternation to absorb gas from said coil while the other is adapted to expel gas previously so absorbed, means for condensing the expelled gas, an expansion valve that can be opened and closed for transmitting the condensed fluid into said coil, automatic means for causing one chamber to act as an absorber while gas is passing through said valve, automatic means for cooling the absorbing chamber during the process of such absorption, automatic means for applying heat to the other chamber during a time between an opening of said valve and the next action of the chamber as an absorber and until most of the gas previously absorbed into it has been expelled, and automatic means for alternating the function of said chambers after each such closing of said valve.

62. In combination an expansion coil, two chambers each adapted in alternation to absorb gas from said coil while the other is adapted to expel gas previously so absorbed, means for condensing the expelled gas, an expansion valve that can be opened and closed for transmitting the condensed fluid into said coil, automatic means for causing one chamber to act as an absorber while gas is passing through said valve, automatic means for applying heat to the other chamber during a time between an opening of said valve and the next action of the chamber as an absorber and until its contents have been heated to a predetermined temperature, and automatic means for alternating the function of said chambers after each such closing of said valve.

63. In combination an expansion coil, two chambers each adapted in alternation to absorb gas from said coil while the other is adapted to expel gas previously so absorbed, means for condensing the expelled gas, an expansion valve that can be opened and closed for transmitting the condensed fluid into said coil, automatic means for causing one chamber to act as an absorber while gas is passing through said valve, automatic means for cooling the absorbing chamber during the process of absorption, automatic means for applying heat to the other chamber from an opening of said valve until most of the gas previously absorbed into the chamber has been expelled and prior to its next acting as an absorber, and automatic means for alternating the function of said chambers after each such closing of said valve.

64. In combination an expansion coil, two chambers each adapted in alternation to absorb gas from said coil while the other is adapted to expel gas previously so absorbed, means for condensing the expelled gas, an expansion valve that can be opened and closed for transmitting the condensed fluid into said coil, automatic means for causing one chamber to act as an absorber while gas is passing through said valve, automatic means for applying heat to the other chamber from an opening of said valve until the contents of the chamber have been heated to a predetermined temperature and prior to its next acting as an absorber, and automatic means for alternating the function of said chamber after each such closing of said valve.

65. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber during a time between an absolute opening of said valve and its next absolute opening and until most of the gas previously absorbed into the chamber has been expelled, and automatic means operative to so heat the other chamber after such next opening of said valve.

66. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber during a time between an absolute opening of said valve and its next absolute opening and until most of the gas previously absorbed into the chamber has been expelled, automatic means operative to so heat the other chamber after such next opening of said valve, and automatic means for substantially equalizing the volume of the contents of the two chambers before each absolute opening of said valve.

67. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber during a time between an absolute opening of said valve and the next acting of the chamber as an absorber and until its contents have been heated to a predetermined temperature, and automatic means operative to so heat the other chamber after such next opening of said valve.

68. In combination an expansion coil, two chambers to which said coil leads, a condenser leading from said chambers into said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber during a time between an absolute opening of said valve and its next absolute opening and until most of the gas previously absorbed into the chamber has been expelled, automatic means operative to so heat the other chamber after such next opening of said valve, and automatic means for cooling said condenser while receiving gas expelled from either chamber and for cooling each chamber while absorbing gas from said coil.

69. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber during a time between an absolute opening of said valve and its next absolute opening and until most of the gas previously absorbed into the chamber has been expelled, automatic means operative to so heat the other chamber after such next opening of said valve, automatic means for substantially equalizing the volume of the contents of the two chambers before each absolute opening of said valve, and automatic means for cooling said condenser while receiving gas expelled from either chamber and for cooling each chamber while absorbing gas from said coil.

70. In combination an expansion coil, two chambers to which said coil leads, a condenser leading from said chambers into said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber during a time between an absolute opening of said valve and the next acting of the chamber as an absorber and until its contents have been heated to a predetermined temperature, automatic means operative to so heat the other chamber after such next opening of said valve, and automatic means for cooling said condenser while receiving gas expelled from either chamber and for cooling each chamber while absorbing gas from said coil.

71. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber during a time between an absolute opening of said valve and the next acting of the chamber as an absorber and until its contents have been heated to a predetermined temperature, automatic means operative to so heat the other chamber after such next opening of said valve, automatic means for substantially equalizing the volume of the contents of the two chambers before each absolute opening of said valve, and automatic means for cooling said condenser while receiving gas expelled from either chamber and for cooling each chamber while absorbing gas from said coil.

72. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber from an absolute opening of said valve until most of the gas previously absorbed into the chamber has been expelled and prior to its next acting as an absorber, and automatic means operative to so heat the other chamber after such next opening of said valve.

73. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber from an absolute opening of said valve until most of the gas previously absorbed into the chamber has been expelled and prior to its next acting as an absorber, automatic means operative to so heat the other chamber after such next opening of said valve, and automatic means for substantially equalizing the volume of the contents of the two chambers before each absolute opening of said valve.

74. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber from an absolute opening of said valve until most of the gas previously absorbed into the chamber has been expelled and prior to its next acting as an absorber, automatic means operative to so heat the other chamber after such next opening of said valve, and automatic means for cooling said condenser while receiving gas expelled from either chamber and for cooling each chamber while absorbing gas from said coil.

75. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber from an absolute opening of said valve until most of the gas previously absorbed into the chamber has been expelled and prior to its next acting as an absorber, automatic means operative to so heat the other chamber after such next opening of said valve, automatic means for substantially equalizing the volume of the contents of the two chambers before each absolute opening of said valve, and automatic means for cooling said condenser while receiving gas expelled from either chamber and for cooling each chamber while absorbing gas from said coil.

76. In combination an expansion coil, two chambers to which said coil leads, a condenser leading from said chambers to said coil, means for preventing a back flow of refrigerant from said chambers into said coil and from said condenser into said chambers, an expansion valve with means for successively opening and closing it for transmitting condensed refrigerating fluid from said condenser into said coil, means automatically operative to heat the contents of one chamber from an absolute opening of said valve until the contents of the chamber have been heated to a predetermined temperature and prior to its next acting as an absorber, automatic means operative to so heat the other chamber after such next opening of said valve, and automatic means for cooling said condenser while receiving gas expelled from either chamber and for cooling each chamber while absorbing gas from said coil.

77. In combination an apparatus for drawing in gas and condensing the same, an expansion valve for transmitting the condensed fluid, an electric device for starting said apparatus in causing such condensation, conductors to and from said device whereby a current may be transmitted to said device so as to so start said apparatus, an initial limiting device operating upon an approach to a high temperature limit to close a circuit in said conductors, means operating to break such circuit before there is a fall from any such high temperature limit, and means subsequently stopping the operation of said apparatus in causing such condensation.

78. In combination an apparatus for drawing in gas and condensing the same, an expansion valve for transmitting the condensed fluid, means starting said apparatus in causing such condensation, an electric device for stopping said apparatus in causing such condensation, conductors to and from said device whereby a current may be transmitted to said device so as to so stop said apparatus, final limiting means subsequently operating to close a circuit in said conductors, and means immediately operating to break any such circuit as soon as said apparatus is so stopped.

79. In combination an apparatus for drawing in gas and condensing the same, an expansion valve for transmitting the condensed fluid, an initial electric device for starting said apparatus in causing such condensation, primary conductors to and from said device whereby a current may be transmitted thereto so as to so start said apparatus, an initial limiting device operating upon an approach to a high temperature limit to close a circuit in said conductors, means operating to break such circuit before there is a fall from any such high temperature limit, a final electric device for stopping said apparatus in causing such condensation, secondary conductors to and from said latter device whereby a current may be transmitted thereto so as to so stop said apparatus, final limiting means subsequently operating to close a circuit in said latter conductors, and means immediately operating to break any such latter circuit as soon as said apparatus is so stopped.

GEORGE P. CARROLL.

Witnesses:
A. MAUDE KIMLIER,
EDWARD F. HALLIN.